United States Patent
Kawakita et al.

(10) Patent No.: US 9,215,480 B2
(45) Date of Patent: Dec. 15, 2015

(54) TERMINAL COOPERATION SYSTEM, RECEIVER, AND RECEIVING METHOD

(75) Inventors: Hiroyuki Kawakita, Tokyo (JP); Kinji Matsumura, Tokyo (JP); Arisa Fujii, Tokyo (JP)

(73) Assignee: NIPPON HOSO KYOKAI, Tokyo (JP)

( * ) Notice: Subject to any disclaimer, the term of this patent is extended or adjusted under 35 U.S.C. 154(b) by 0 days.

(21) Appl. No.: 14/117,886

(22) PCT Filed: May 18, 2012

(86) PCT No.: PCT/JP2012/062798
§ 371 (c)(1),
(2), (4) Date: Nov. 15, 2013

(87) PCT Pub. No.: WO2012/161118
PCT Pub. Date: Nov. 29, 2012

(65) Prior Publication Data
US 2014/0089985 A1  Mar. 27, 2014

(30) Foreign Application Priority Data

May 20, 2011 (JP) .................................. 2011-113093

(51) Int. Cl.
*H04N 5/445* (2011.01)
*H04N 21/235* (2011.01)
*H04H 20/28* (2008.01)
*H04H 20/93* (2008.01)
*H04H 60/73* (2008.01)
(Continued)

(52) U.S. Cl.
CPC .......... *H04N 21/2353* (2013.01); *H04H 20/28* (2013.01); *H04H 20/93* (2013.01); *H04H 60/73* (2013.01); *H04H 60/82* (2013.01); *H04N 21/278* (2013.01); *H04N 21/4722* (2013.01); *H04N 21/8405* (2013.01); *H04N 21/4828* (2013.01)

(58) Field of Classification Search
CPC .......... H04N 21/4828; H04N 21/4722; H04N 21/4126
USPC ...................................... 725/52, 53
See application file for complete search history.

(56) References Cited

U.S. PATENT DOCUMENTS 6,925,650 B1* 8/2005 Arsenault et al. ............... 725/39
6,928,262 B1 8/2005 Kanemitsu
(Continued)

FOREIGN PATENT DOCUMENTS

EP   1 898 325 A1   3/2008
JP   A 2004-128724   4/2004
(Continued)

OTHER PUBLICATIONS

ISO/IEC 13818-1 MPEG2-Systems, International Organization for Standardization, 1994.
(Continued)

*Primary Examiner* — Pankaj Kumar
*Assistant Examiner* — Timothy Newlin
(74) *Attorney, Agent, or Firm* — Drinker Biddle & Reath LLP

(57) ABSTRACT

A receiver includes: a broadcast reception unit configured to receive a broadcast signal; a keyword acquisition unit configured to acquire a search keyword based on metadata included in the broadcast signal; and a transmission unit configured to transmit the search keyword acquired by the keyword acquisition unit to a terminal device.

9 Claims, 25 Drawing Sheets

(51) Int. Cl.
*H04H 60/82* (2008.01)
*H04N 21/4722* (2011.01)
*H04N 21/8405* (2011.01)
*H04N 21/278* (2011.01)
*H04N 21/482* (2011.01)

(56) References Cited

U.S. PATENT DOCUMENTS

| | | | |
|---|---|---|---|
| 7,801,875 B2* | 9/2010 | Kim | 707/706 |
| 8,745,670 B2* | 6/2014 | White | 725/60 |
| 2002/0042920 A1* | 4/2002 | Thomas et al. | 725/87 |
| 2002/0144295 A1* | 10/2002 | Hirata | 725/153 |
| 2003/0172382 A1* | 9/2003 | Kim | 725/53 |
| 2004/0107449 A1* | 6/2004 | Fukuda et al. | 725/135 |
| 2007/0050811 A1* | 3/2007 | Moriwaki et al. | 725/37 |
| 2009/0037387 A1* | 2/2009 | Kim | 707/3 |
| 2009/0164460 A1* | 6/2009 | Jung et al. | 707/5 |
| 2010/0162164 A1* | 6/2010 | Kwon et al. | 715/803 |
| 2010/0194892 A1* | 8/2010 | Hikita et al. | 348/157 |
| 2011/0138317 A1* | 6/2011 | Kang et al. | 715/780 |
| 2012/0054610 A1* | 3/2012 | Archer | 715/716 |

FOREIGN PATENT DOCUMENTS

| | | |
|---|---|---|
| JP | A 2004-362261 | 12/2004 |
| JP | A 2008-011250 | 1/2008 |
| JP | A 2008-160243 | 7/2008 |
| JP | A 2009-258824 | 11/2009 |

OTHER PUBLICATIONS

DVB-GEM1.2 [ETSI TS 102 543 V1.1.1 (Mar. 2008) Digital Video Broadcasting (DVB); Globally Executable MHP (GEM) Specification 1.2].

English Translation of "Application Execution Engine Platform for Digital Broad Casting", ARIB STD-B23 V1.1.

International Search Report dated Jun. 12, 2012 for International Patent Application No. PCT/JP2012/062798.

Search Report dated Oct. 2, 2014 for European Patent Application No. 12789990.4.

* cited by examiner

FIG. 6

```xml
<?xml version="1.0" encoding="utf-8"?>
<mhp:ServiceDiscovery xmlns:mhp="urn:dvb:mhp:2009"
            xmlns:ipi="urn:dvb:metadata:iptv:sdns:1008-1"
            xmlns:mpeg7="urn:tva:mpeg7:2005"
            xmlns:xsi="http://www.w3.org/2001/XMLSchema-instance">
  <mhp:ApplicationDiscovery>
    <mhp:ApplicationList>
      <mhp:Application>
        <mhp:appName ipi:Language="eng">SyncPlayerSample</mhp:appName>
        <mhp:applicationIdentifier>
          <mhp:orgId>100</mhp:orgId>
          <mhp:appId>200</mhp:appId>
        </mhp:applicationIdentifier>
        <mhp:applicationDescriptor>
          <mhp:controlCode mhp:type="ARIB-J">AUTOSTART</mhp:controlCode>
          <mhp:visibility>VISIBLE_ALL</mhp:visibility>
          <mhp:serviceBound>false</mhp:serviceBound>
          <mhp:priority>0</mhp:priority>
          <mhp:version>0</mhp:version>
          <mhp:mhpVersion>
            <mhp:profile>0</mhp:profile>
            <mhp:versionMajor>0</mhp:versionMajor>
            <mhp:versionMinor>0</mhp:versionMinor>
            <mhp:versionMicro>0</mhp:versionMicro>
          </mhp:mhpVersion>
        </mhp:applicationDescriptor>
        <mhp:applicationSpecificDescriptor>
          <mhp:dvbjDescriptor>
            <mhp:location>http://192.168.11.37/SyncDemo.jar</mhp:location>
            <mhp:applicationStructure>
              <mhp:classPathExtension/>
              <mhp:initialClass>demo.SyncPlayerDemo</mhp:initialClass>
            </mhp:applicationStructure>
          </mhp:dvbjDescriptor>
        </mhp:applicationSpecificDescriptor>
      </mhp:Application>
    </mhp:ApplicationList>
  </mhp:ApplicationDiscovery>
</mhp:ServiceDiscovery>
```

FIG. 23

```xml
<?xml version="1.0" encoding="utf-8" ?>
- <Result xmlns:xsi="http://www.w3.org/2001/XMLSchema-instance" engineID="http://[nhk-service].n
hk.or.jp/BROADCAST COMMUNICATION COOPERATION SERVICE/T.B.D.">
- <Item xsi:type="Program">
    <ContentID>N200800011800000</ContentID>
    <Channel>NHK D  GENERAL </Channel>
    <Title> LUCK TO FAMILY </Title>
    <HashTag>#nhk_kanpai</HashTag>
    <MailAddress>kanpai@nhk.or.jp</MailAddress>
    <Url>http://www.nhk.or.jp/program/kanpai/</Url>
    <ReplayUrl>http://[nhk-service].nhk.or.jp/...</ReplayUrl>
- <Keywords>
    - <Keyword>
        <Value kind="item"> MOSIO </Value>          ~L21
      </Keyword>
    - <Keyword>
        <Value kind="person:actress"> O YAMA O KO </Value>   ~L22
      </Keyword>
    - <Keyword>
        <Value kind="place">HIROSHMA-KEN KURE-SHI KAMIKAMAGARISHIMA ISLAND</Value>   ~L23
        <Latitude>34.188784</Latitude>
        <Longitude>132.68751</Longitude>
      </Keyword>
    - <Keyword>
        <Value kind="place"> HIROSHMA-KEN KURE-SHI SHIMOKAMAGARISHIMA ISLAND </Value>  ~L24
        <Latitude>34.217825</Latitude>
        <Longitude>132.629609</Longitude>
      </Keyword>
    - <Keyword>                                                  L31
        <Value kind="place"> SALTERY </Value>  ~L25             /
        <Description> △ DA △ O AND O YAMA O KO VISITED SALTERY "KAMAGARI SALT VILLAGE"
                LOCATED ON SHIMOKAMAGARISHIMA ISLAND </Description >
        <Latitude>34.165298</Latitude>
        <Longitude>132.747288</Longitude>
      </Keyword>
    - <Keyword>
        <Value flag="new" kind="place"> KAMAGARI HIGH SCHOOL </Value>  ~L26
        <Description> O YAMA O KO VISITED "KAMAGARI HIGH SCHOOL" LOCATED ON
                KAMIKAMAGARISHIMA ISLAND  </Description> ~L32
        <Latitude>34.186246</Latitude>    }
        <Longitude>132.692184</Longitude> } ~A21
      </Keyword>
  </Keywords>
</Item>
</Result>
```

TERMINAL COOPERATION SYSTEM, RECEIVER, AND RECEIVING METHOD

TECHNICAL FIELD

The present invention relates to a terminal cooperation system, a receiver receiving airwaves, and a receiving method of receiving airwaves.

Priority is claimed on Japanese Patent Application No. 2011-113093, filed May 20, 2011, the contents of which is incorporated herein by reference.

BACKGROUND ART

When viewers viewing television broadcasts want to obtain more detailed information associated with programs which the viewers are viewing, the viewers may consider searching for keywords using searching services with portable terminal devices or the like.

Non-Patent Reference 1 discloses a technology for outputting an audio in synchronization with a video in association with display of information in a receiver.

PRIOR ART DOCUMENTS

Non-Patent Reference

[Non-Patent Reference 1]
"ISO/IEC 13818-1 MPEG2-Systems" in International Organization for Standardization/International Electrotechnical Commission, 1994

SUMMARY OF INVENTION

Problem to be Solved by the Invention

When viewers perform keyword searching on items associated with programs with portable terminal devices or the like, there is a problem that it takes some time to input the search keywords.

When the technology disclosed in Non-Patent Reference 1 is used, audio information associated with a program video can be provided to viewers. However, time and effort to input the search keywords associated with the program video may not be saved. Accordingly, with the technology disclosed in the Non-Patent Reference 1, users may not acquire various kinds of information by simply performing the keyword searching.

The present invention is devised in consideration of the above-mentioned circumstances and provides a terminal cooperation system and a receiver in which time and effort to input keywords used for search can be saved when information associated with a program is acquired.

Means to Solve the Problem

[1] A first aspect of the present invention is a terminal cooperation system including: a receiver; and a terminal device, wherein the receiver includes: a broadcast reception unit configured to receive a broadcast signal, a keyword acquisition unit configured to acquire search keywords based on metadata included in the broadcast signal, and a transmission unit configured to transmit the search keywords acquired by the keyword acquisition unit to the terminal device, and wherein the terminal device includes: a reception unit configured to receive the transmitted search keywords, a display unit configured to display the received search keywords, an operation unit that configured to receive a selection operation of selecting the search keyword from the search keywords displayed by the display unit, and a transmission unit configured to transmit the selected search keyword to a search engine.

A broadcast transmission device transmits metadata together with broadcast contents when the broadcast transmission device transmits the broadcast contents. A receiver receives the broadcast signal to acquire the broadcast contents and the metadata. A data acquisition unit can obtain search keywords associated with the broadcast contents by acquiring the search keywords based on the acquired metadata. When the search keywords are transmitted to a terminal device, the terminal device displays the search keywords so that the search keywords can be selected on a display screen. Thus, a user can obtain search results using the search keywords associated with the broadcast contents without inputting the search keywords.

[2] In the first aspect of the present invention, the keyword acquisition unit may be configured to acquire the search keyword based on the metadata acquired from an event information table included in the broadcast signal.

[3] In the first aspect of the present invention, the keyword acquisition unit may be configured to acquire the search keyword based on the metadata acquired from BML contents included in the broadcast signal.

[4] In the first aspect of the present invention, the keyword acquisition unit may be configured to acquire the search keyword based on the metadata transmitted with a DSM-CC data carousel.

[5] A second aspect of the present invention is a receiver including: a broadcast reception unit configured to receive a broadcast signal; a keyword acquisition unit configured to acquire a search keyword based on metadata included in the broadcast signal; and a transmission unit configured to transmit the search keyword acquired by the keyword acquisition unit to a terminal device.

[6] A third aspect of the present invention is a receiving method including: receiving a broadcast signal; acquiring a search keyword based on metadata included in the broadcast signal; and transmitting the acquired search keyword to a terminal device.

Effect of the Invention

According to the present invention, it is possible to save time and effort to input a character string which is a keyword and simply acquire information associated with a program.

BRIEF DESCRIPTION OF THE DRAWINGS

FIG. 6 is a diagram illustrating an example a text expression of an AIT used in the broadcast communication cooperation system.

FIG. 23 is a data-structure diagram illustrating an example of the structure of transmission data including search keywords according to the embodiment.

EMBODIMENT FOR CARRYING OUT THE INVENTION

Hereinafter, embodiments of the present invention will be described in detail with reference to the drawings.

Figure 1:
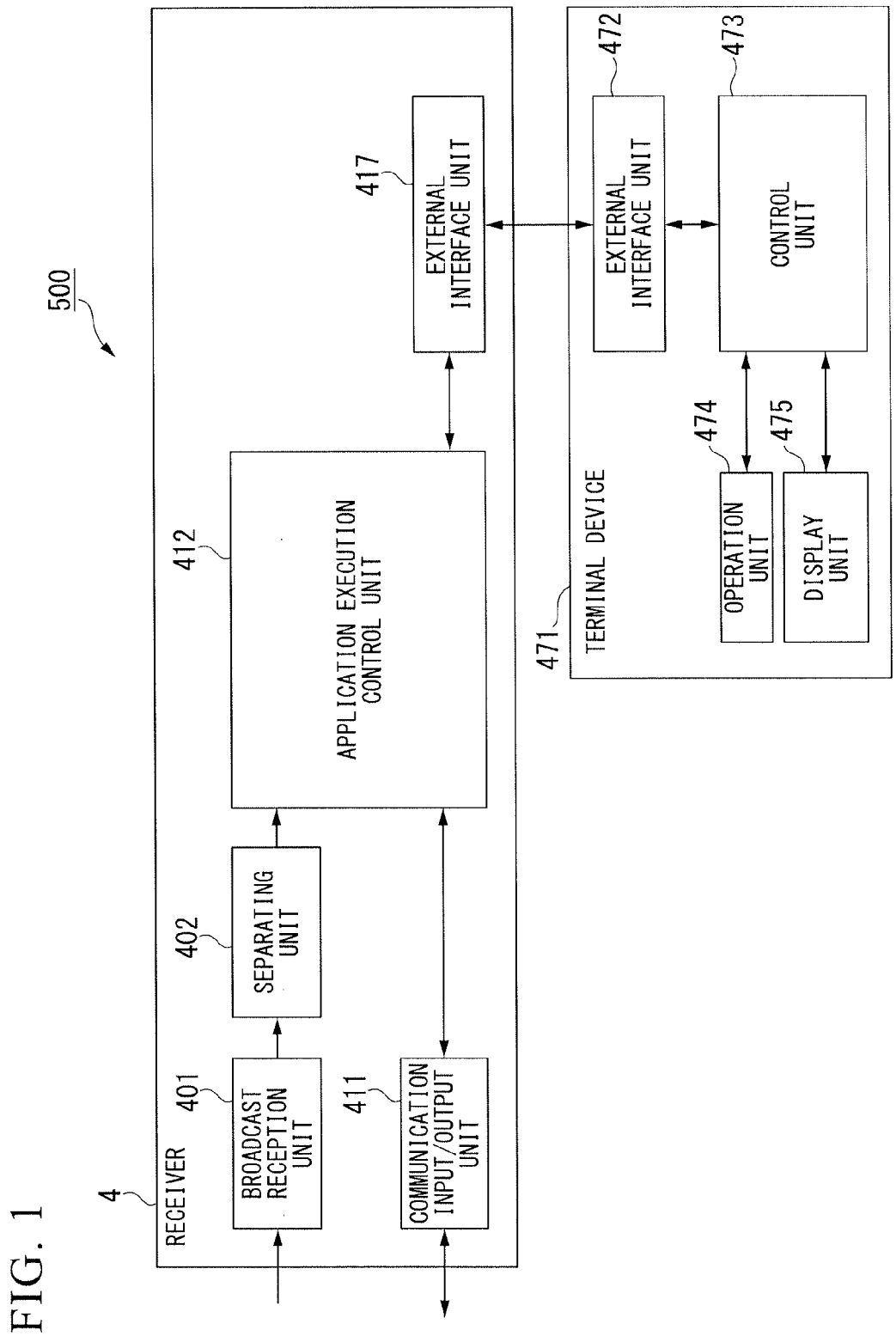
FIG. 1 is a functional block diagram illustrating the constitution of a receiver according to an embodiment of the present invention.

FIG. 1 is a functional block diagram illustrating the constitution of a receiver according to an embodiment of the present invention. As illustrated in FIG. 1, a terminal cooperation system 500 includes a receiver 4 and a terminal device 471. The receiver 4 includes a broadcast reception unit 401, a separating unit 402, a communication input/output unit 411, an application execution control unit (keyword acquisition unit) 412, and an external interface unit (transmission unit) 417. The terminal device 471 includes an external interface unit (a reception unit or a transmission unit) 472, a control unit 473, an operation unit 474, and a display unit 475.

The broadcast reception unit 401 receives a broadcast signal. Here, the broadcast signal received by the broadcast reception unit 401 includes various kinds of data such as an AIT or an extended EIT. The AIT or the extended EIT includes search metadata.

Here, the "search metadata" is information associated with search candidates used to search for information associated with broadcast contents and is, for example, one or both of a search keyword and search address information. The "search keyword" mentioned here is a character string used to search for information associated with a broadcast program. Further, the "search address information" mentioned here is network address information of a storage region in which the search keyword is stored. The search address information is, for example, address information of a web page in which the search keywords are stored and is expressed in the format of a uniform resource locator (URL).

For example, the search metadata is included in an AIT or an extended EIT of a broadcast signal and is transmitted. As the transmission method, for example, a DMSS-CC data carousel is used.

For example, when the search metadata is included in the AIT and transmitted and the broadcast reception unit 401 receives the broadcast signal, the separating unit 402 separates the AIT from the broadcast signal and outputs the separated AIT to the application execution control unit 412. The application execution control unit 412 reads the search metadata from the AIT. The same also applies to a case in which the search metadata is included in an extended FIT and transmitted.

The separating unit 402 is a demultiplexer and separates a broadcast stream supplied from the broadcast reception unit 401 into various kinds of data. In particular, the separating unit 402 acquires the search metadata from the broadcast stream.

The application execution control unit 412 executes an application of a broadcast communication cooperation service. In particular, the application execution control unit 412 acquires the search keyword based on the search metadata included in the broadcast signal. The search metadata is included in metadata.

Here, when the search metadata is included in an event information table (EIT) and transmitted, the application execution control unit 412 acquires the search keyword based on the search metadata obtained from the event information table included in the broadcast signal.

When the search metadata is included in BML contents and transmitted, the application execution control unit 412 acquires the search keyword based on the search metadata obtained from the BML contents included in the broadcast signal.

When the search metadata is transmitted with a DSM-CC data carousel, the application execution control unit 412 acquires the search keyword based on the search metadata transmitted with the DSM-CC data carousel.

For example, search data is a search keyword that is inserted and included in data expressed in an extensible markup language (XML) format as a predetermined tag. The application execution control unit 412 reads and acquires the search keyword from the data expressed in the XML format.

When the search metadata is network address information indicating a storage region in which the search keyword is stored, the application execution control unit 412 acquires the search keyword from the storage region according to the network address information. For example, when the search keyword is stored in a storage region which a data server device on a network has and the application execution control unit 412 acquires the network address of the format storage region as the search metadata included in the AIT or the extended EIT from a uniform resource locator (URL), the application execution control unit 412 acquires the search keyword from the storage region in which the search keyword is stored based on the acquired URL.

The external interface unit 417 performs communication with the terminal device 471. In particular, the external interface unit 417 transmits the search keyword acquired by the application execution control unit 412 to the terminal device 471.

The communication input/output unit 411 performs communication via a communication network 9 to input and output data. In particular, when the separating unit 402 acquires the network address of the storage region in which the search keyword is stored as the search metadata, the communication input/output unit 411 acquires the search keyword stored in the storage region indicated by the network address.

The terminal device 471 receives various input operations from a user, transmits the various input operations to the receiver 4, and displays various kinds of data transmitted from the receiver 4.

The external interface unit 472 of the terminal device 471 performs communication with the receiver 4. In particular, the external interface unit 472 receives the search keyword transmitted from the receiver 4. The external interface unit 472 transmits the search keyword selected through a selection operation received by the operation unit 474 to a search engine.

The control unit 473 controls each unit of the terminal device 471.

The display unit 475 includes, for example, a display screen such as a liquid crystal display and displays various kinds of data such as moving images, still images, and text data under the control of the control unit 473. In particular, the display unit 475 displays the search keyword received by the external interface unit 472. Here, the number of search keywords displayed by the display unit 475 may be one or plural.

The operation unit 474 includes, for example, a touch panel installed on the display screen of the display unit 475 and receives an input operation from the user. In particular, the operation unit 474 receives a selection operation of selecting the search keyword from the search keywords displayed on the display unit 475.

The "selection operation" mentioned here is an operation of selecting one search keyword or one of the plurality of search keywords. The operation unit 474 receives the selection operation as a search instruction. The "search instruction" mentioned here is an instruction to search for the search keyword displayed by the display unit 475.

When the display unit 475 displays one search keyword, the operation unit 474 receives a selection operation in which the user touches the search keyword as a search instruction. On the other hand, when the display unit 475 displays the plurality of search keywords, the operation unit 474 receives a selection operation in which the user touches any search keyword as a search instruction.

Here, various devices capable of performing keyword searching can be used as the terminal device 471. For example, the terminal device 471 is a portable terminal device such as a mobile phone or a personal digital assistant (PDA) or a computer such as a personal computer (PC) or a tablet PC. Examples of a scheme for communication which the external interface unit 417 performs with the terminal device 471 include a scheme of performing communication via a wireless LAN, a short-range communication scheme such as infrared communication, and a scheme of performing electronic mail communication via the Internet.

[Description of Example of Broadcasting/Communication Cooperation System to which Present Invention is Applied]

Here, an example of a broadcasting/communication cooperation system to which the present invention is applied will be described. The example of the broadcasting/communication cooperation system (a broadcasting/communication convergence system, a broadcasting/communication system, or a transmitting/receiving system) to which the present invention is applied, for example, is a Hybridcast (registered trademark) system, and provides a broadcasting/communication cooperation service (a Hybridcast (registered trademark) service, a broadcasting/communication convergence service, and a broadcasting/communication service). The broadcasting/communication cooperation service implemented in an example of the broadcasting/communication cooperation system to which the present invention is applied cooperates a digital broadcasting service and a communication service by the Internet or the like. For example, in the broadcasting/communication cooperation service, a receiver such as a digital TV, a personal computer, or a portable terminal simultaneously displays screens by combining a display screen (hereinafter also referred to as a "broadcast screen" of a program display screen) of a broadcast program (hereinafter also referred to as a "program") transmitted through broadcasting with a display screen (hereinafter also referred to as an "application screen" or "application display screen") of a service or contents acquired by an application implemented in the receiver through communication.

[1. System Model]

[1.1 User of Broadcasting/Communication Cooperation System]

Figure 2:
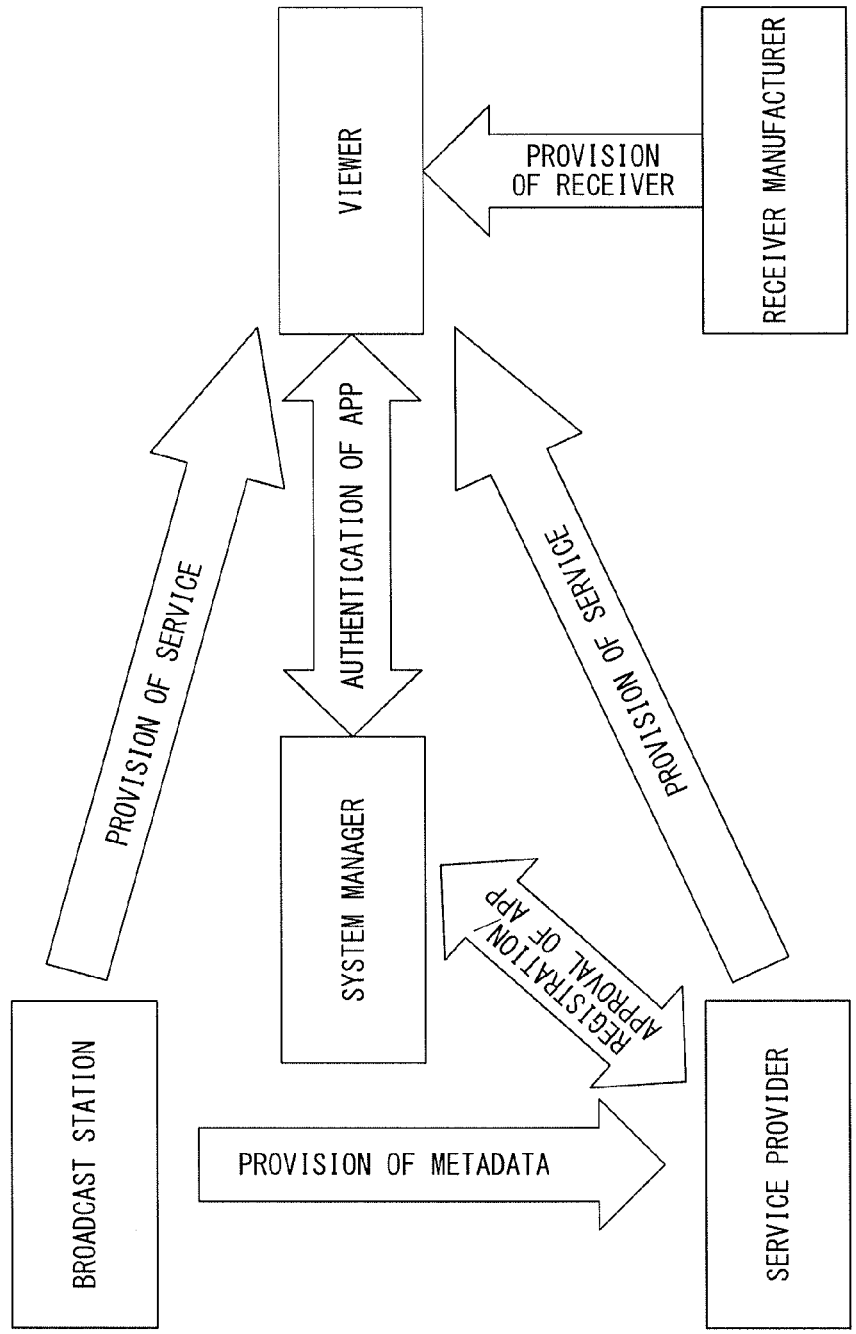
FIG. 2 is a diagram illustrating users of an example of the broadcast communication cooperation system to which the present invention is applied and relations therebetween.

FIG. 2 is a diagram illustrating users of the broadcasting/communication cooperation system and their relationships.

A broadcast station, which transmits a program associated with an organization, distributes a program to a viewer through broadcast radio waves or a communication network. The broadcast station provides metadata related to a program to a service provider in order to enrich a broadcasting/communication cooperation service.

The service provider for providing the broadcasting/communication service creates and distributes contents and an application (hereinafter also referred to as an "app") for providing the broadcasting/communication cooperation service to the viewer. Hereinafter, when the "application" is simply referred to, this indicates an application for providing the broadcasting/communication cooperation service (an application of the broadcasting/communication cooperation service). It is not necessary for a creator and a distributor of the contents or the application to be the same service provider. The broadcast station may also be a service provider. The service provider can also provide link information to another service provider. The service provider can request registration of an application and acquire permission from a system manager in order to indicate that the application to be provided is official. The approved application is not limited to an operation on the receiver. On the other hand, although it is difficult for a screen to be displayed by a denied application to overlap a display screen and audio of a program, it is possible to reduce the display screen of the application and display the reduced display screen outside the screen of the broadcast program. The approved application is referred to as an official application, and the disapproved application is referred to as an unofficial application. The official application is also referred to as a registered application, an authenticated application, a certified application, a licensed application, an authorized application, an authorized (A) type application, or an A application. In addition, the unofficial application is also referred to as a general application, an unauthenticated application, an uncertified application, an unofficial application, an unauthorized (U) type application, or a U application.

The system manager is an authority for certifying that the application (receiver app) to be provided to the viewer is official. The determination of the system manager of whether to approve the requested application is based on entrustment from the broadcast station.

A receiver manufacturer manufactures and sells the receiver. The receiver manufacturer can enable the receiver to operate by installing an application for making various settings of the receiver and the like in the receiver. In this case, a display screen of the application in the receiver may overlap a display screen (video) of a program.

A viewer who views a program broadcast by a broadcast station uses a broadcasting/communication cooperation service.

The viewer can download or start the application according to his/her own intention. In addition, the viewer can cause an application display screen to overlap a program display screen (video) according to his/her own intention.

[1.2. System Configuration of Broadcasting/Communication Cooperation System]

Figure 3:
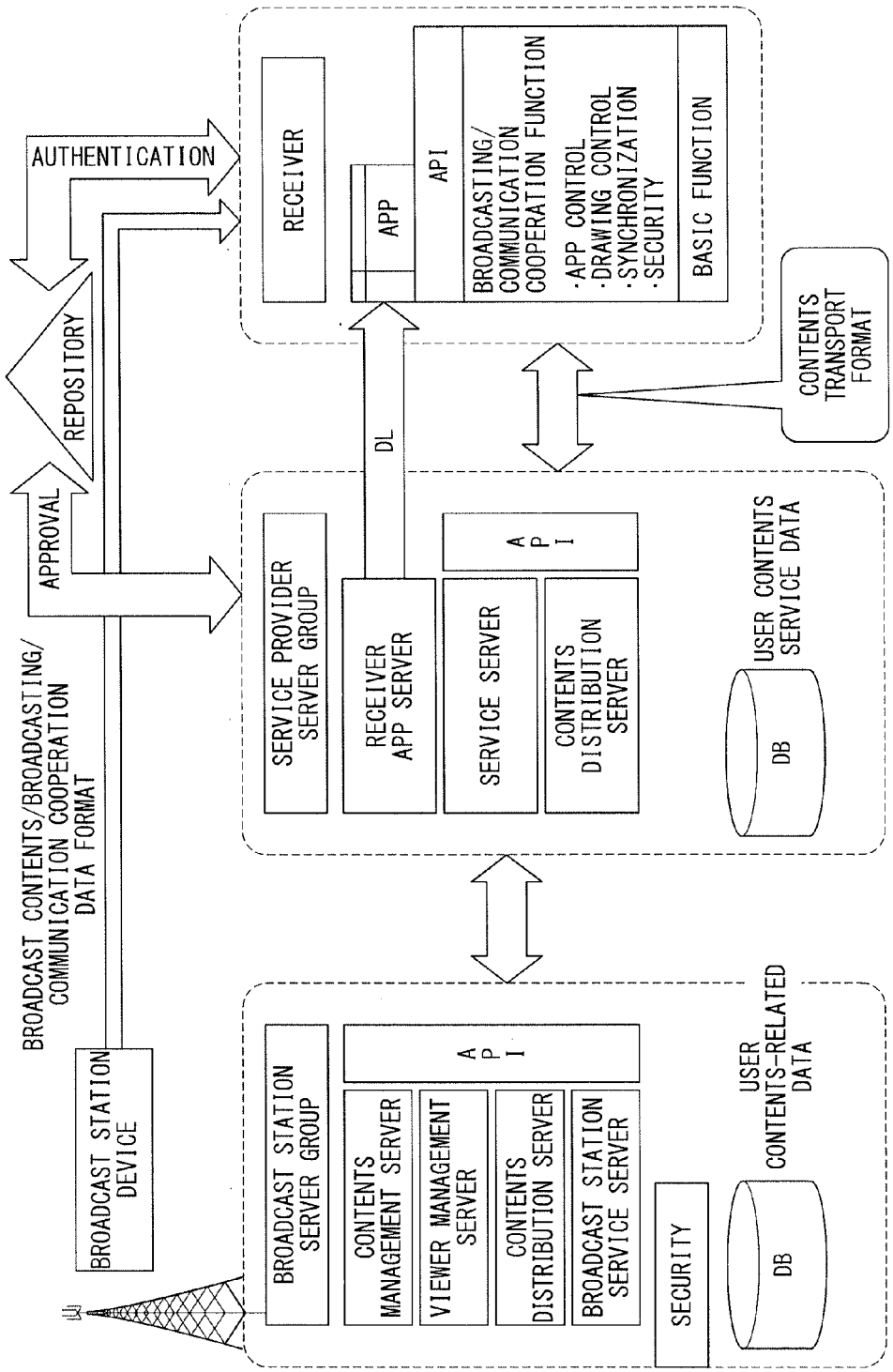
FIG. 3 is a diagram illustrating the overall constitution of the broadcast communication cooperation system.

FIG. 3 is a diagram illustrating an overall configuration of the broadcasting/communication cooperation system. The broadcasting/communication cooperation system is configured by functionally adding a "broadcast station server group," a "service provider server group," and a "receiver" to a current broadcast station facility using radio waves.

The broadcast station possesses the broadcast station facility. Further, the broadcast station configures and administrates both the broadcast server group and the service provider server group. In addition, the service provider configures and administrates the service provider server group. The system manager administrates a repository server. The receiver manufacturer manufactures and sells the receiver. The viewer possesses the receiver and uses the broadcasting/communication cooperation service.

The receiver (a Hybridcast (registered trademark) receiver or a broadcast reception communication device) is equipped with a standardized common application program I/F (API). In addition, the receiver receives a broadcast of a current scheme such as a terrestrial digital broadcast or a broadcasting satellite (BS) digital broadcast.

The broadcast station facility multiplexes a signal for starting the broadcasting/communication cooperation system into broadcast waves. A multiplexing scheme will be described later.

[1.3 Configuration Example of Broadcast Station Server Group]

The broadcast station server group manages and distributes contents and metadata provided in the broadcast station.

For example, the broadcast station server group includes various servers, a data accumulation unit (database (DB)), and an API, and servers of the broadcast station server group include a contents management server, a viewer management server, a contents distribution server, and a broadcast station service server.

The contents management server, which manages contents, manages a program and metadata which are broadcast contents. The contents management server includes a program management server which manages a broadcast program or a program to be broadcast or a metadata management server which manages metadata related to the program. The metadata, for example, represents a program title, a program identifier (ID), a program outline, a performer, a staff, a broadcasting date, a script, subtitles, an explanation, etc.

The viewer management server manages viewers (users), and the contents distribution server distributes contents data through communication. The broadcast station service server is a server for enabling the broadcast station to provide a service to the service provider. The service provided by the broadcast station service server, for example, is a social network service managed by the broadcast station, a web log (blog) of each broadcast program, or the like.

The data accumulation unit of the broadcast station server group includes a part storing contents and metadata provided in the broadcast station and a database (DB). Only the service provider that performs management can access accumulated data, and a limitation is set so that access by others is disabled.

The API of the broadcast station server group is used to provide data in response to a request from the service provider server group. The API is a program to be called by an application to receive the service and its execution unit.

[1.4 Configuration Example of Service Provider Server Group]

The service server group administrated by the service provider manages and provides an application and contents. The service server group includes a receiver app server, a service server, a contents distribution server, a data accumulation unit (DB), and an API.

The receiver app server is a server which manages an application of a broadcasting/communication cooperation service. The service provider saves, manages, and distributes an application to operate in the receiver.

The service provider includes an organization or an individual. In response to a request from the receiver, the receiver app server notifies the receiver of a saving position of an application file (the application file will be described later), and distributes the application file.

The service server is a server which provides a service in response to a request from the application to operate in the receiver. For example, there are a multilingual subtitle server, a speech speed conversion audio server, a social TV server, a recommendation server, a program review server, a bookmark server, etc. as the service server.

The contents distribution server is a server which provides contents in response to a request from an application to operate in the receiver. The contents distribution server, for example, includes a video on demand (VOD) distribution server, a subtitle distribution server, a multiview distribution server, etc.

The data accumulation unit of the service provider server group is a place in which contents data, metadata, data created by the service provider, viewer data, and an application file are saved. Only the service provider that performs management can access data saved in the data accumulation unit and access by others is disabled.

In response to a request from the application operating in the receiver, the API of the service server group is used to provide an application file, contents, and a service.

[1.5 Receiver]

The receiver receives and displays a broadcast of a current scheme and executes the broadcasting/communication cooperation service. The broadcast of the current scheme is a terrestrial digital broadcast, a satellite broadcast such as a BS digital broadcast, or a data broadcast. In addition, the receiver is connected to the Internet.

The receiver sends an application download request to the service provider server based on information multiplexed into received broadcast waves. The receiver executes an application program included in a downloaded application file, and therefore an application operates on the receiver. The application operating on the receiver acquires contents by accessing the service provider server.

In addition, the receiver has a broadcasting/communication cooperation function which is necessary to execute a broadcasting/communication cooperation service such as a synchronization function or an application control function. Because an API for the broadcasting/communication cooperation function is common, production of the application is easy and the application does not depend upon the receiver.

In the broadcasting/communication cooperation service, a function for cooperation with a device such as a personal computer or a portable terminal is introduced.

There are a broadcasting/communication cooperation base function and an optional function to be implemented if necessary as the broadcasting/communication cooperation function. The receiver manufacturer implements the broadcasting/communication cooperation base function in all receivers. The application uses the broadcasting/communication cooperation function through the API. The broadcasting/communication cooperation function operates based on the API as will be described later.

The API to be implemented by the receiver is specified to cause an operation of the application to be the same without depending upon the receiver. Because all applications perform a process of the receiver through the API, it is difficult for the application to access a function unique to the receiver without involving the API.

[1.6 Terminal Cooperation Model]

Figure 4:
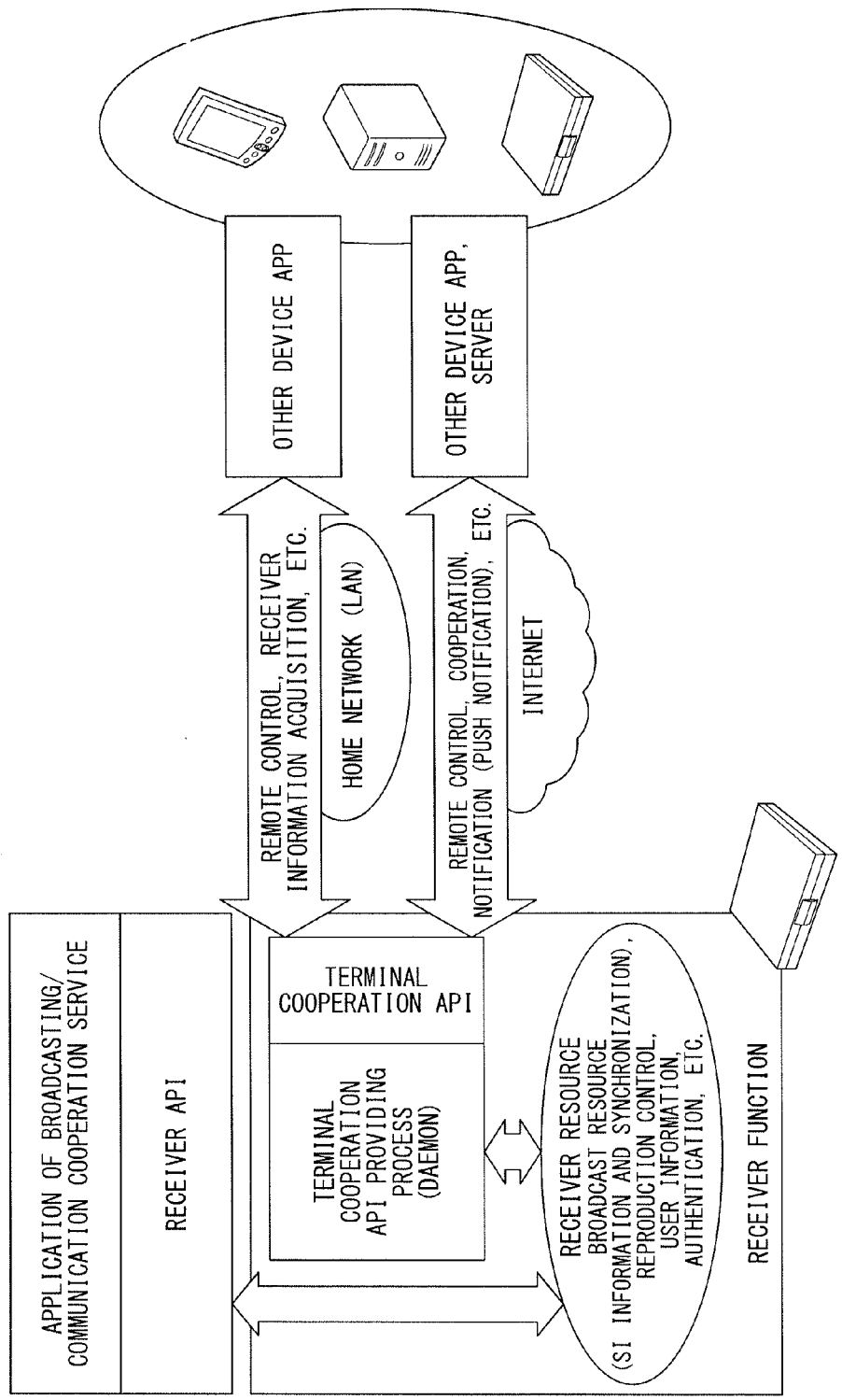
FIG. 4 is a diagram illustrating a terminal cooperation model of the broadcast communication cooperation system.

FIG. 4 is a diagram illustrating a terminal cooperation model of the broadcasting/communication cooperation system.

The receiver can provide a service in cooperation with a terminal such as a portable terminal. As the cooperation terminal, for example, there are a personal computer, a portable telephone, a tablet, a smartphone, a personal digital assistant (PDA), etc. The receiver provides a function capable of being used by another terminal as a receiver function as the API. The API that provides the function capable of being used by the other terminal is referred to as a terminal cooperation API. For example, using the terminal cooperation API, the application operating on the portable terminal can access a broadcast resource for acquisition of program information and the like or call the receiver function such as reproduction control.

[1.6.1 Terminal Cooperation API]

The terminal cooperation API is an API for enabling another terminal or an application operating on the other terminal to use the function of the receiver. The cooperation terminal targets a terminal on a home network (LAN) and a terminal having access through the Internet. A process of specifying an API which provides various operations will be described later.

[1.6.2 Process of Providing Terminal Cooperation API]

The process of providing the terminal cooperation API operating on the receiver causes the terminal cooperation API to operate. The process of providing the terminal cooperation API operates like a type of resident daemon process.

[1.6.3 Protocol for Calling API]

As the protocol for calling the terminal cooperation API, for example, Representational State Transfer (RESTful), Universal Plug and Play (UPnP), Extensible Messaging and Presence Protocol (XMPP), etc. are used.

[1.6.4 Push Notification Function]

The receiver also corresponds to a notification function in which a server or the like on the Internet notifies the receiver of information in a push. The receiver receives the notification information provided by the push from the server or the like. According to the notification function, some reception operations may be controlled, and the notification function is also specified as part of a terminal cooperation API spec.

[2. Broadcasting/Communication Cooperation Application]

[2.1 Service and Application Models]

The application model of the broadcasting/communication cooperation system is a model added and changed based on a concept of an application model of Digital Video Broadcasting Project (DVB)-Globally Executable Multimedia Home Platform (GEM) 1.2.

[2.1.1 Broadcasting/Communication Cooperation Application]

An operation of the application of the broadcasting/communication cooperation service is classified into two patterns of an operation (cooperation) cooperating with audio visual (AV) contents and an independent operation (non-cooperation) of an application. The AV contents are broadcast contents (program) or communication contents (VoD or the like).

In the case of the cooperation, life cycle control of an application such as a start is performed in cooperation with broadcast or communication contents. The application is started based on an application information table (AIT) (the AIT and application start information) distributed along with the AV contents. In this case, in addition to a start or end operation by the viewer, an AV contents provider such as the broadcast provider can also control a life cycle of an automatic start or end of the application and the like.

On the other hand, in the case of the non-cooperation, the application independently starts and ends without cooperation with broadcast or communication contents. In this case, the life cycle of the application such as the start or end of the application is controlled only by the viewer.

[2.1.2 Service]

Although the service is a continuous service of a program which is organized by the broadcast provider and is able to be broadcast as part of the schedule in the related art, such a concept is extended in the broadcasting/communication cooperation system and two service types of a stream-dependent service and an independent service are defined.

Figure 5:
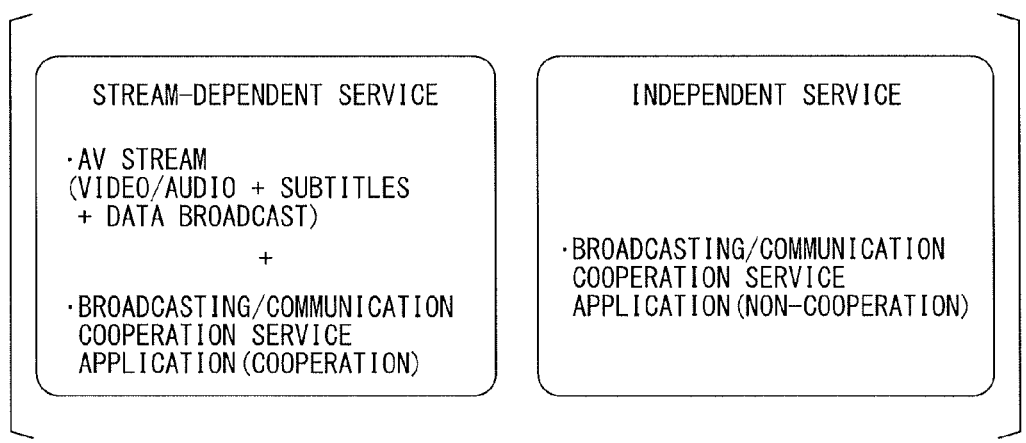
FIG. 5 is a diagram illustrating conception of service classes of the broadcast communication cooperation system.

FIG. 5 is a conceptual diagram of a type of service.

In the receiver, an associated application is started by artificially selecting channels of the stream-dependent service and the independent service.

The stream-dependent service has an extended meaning from a concept of a service of the related art, and is configured by adding an application(s) operating in cooperation with the AV stream to be transmitted through broadcasting or communication to the AV stream. It is possible to start the application in cooperation through selection/reproduction of the AV stream (channel selection in the case of the broadcasting).

On the other hand, the independent service is configured only by an application(s) without including a video/audio stream. The viewer causes the application to be started by selecting the independent service.

[2.1.3 Start of Application Acquired on the Fly and Start of Installed Application]

For the start of an application, there are two methods including a method of acquiring and starting the application file on the fly and a method of starting the application file accumulated (installed) on the receiver in advance. On-the-fly is a method of acquiring the application file through communication when the application is executed, and is also referred to as a non-installation type and a direct execution type.

The receiver starts an application program of an application file in a local file system based on dissemination of the application according to the AIT as will be described later. When the application file is acquired and installed through communication, an operation in which the receiver rewrites information within a location layer (see Section 2.5.1) set in the associated AIT to a location on the local file system, and generates a value (necessary in an AIT unit of the independent service) for identifying the independent service if necessary and the like are necessary.

[2.2 Application Dissemination Method (Signaling)]

[2.2.1 Application Start Information (AIT)]

The dissemination of the application included in the service is performed according to notification application start information at the time of service selection. The AIT defined in ARIB STD-B23 (hereinafter referred to as ARIB-J) is used as the application start information. In each of the stream-dependent service and the independent service, the AIT for the service is disseminated. Details of a method of sending the AIT in each service will be shown hereinafter.

FIG. 6 is a diagram illustrating an example of a text representation of the AIT for use in the broadcasting/communication cooperation system.

The AIT for use in the broadcasting/communication cooperation system is based on the AIT specified in ARIB-J. In the AIT, there are a binary representation for transmission in a table of service information (SI) and a text representation (AIT file) according to an extensible markup language (XML) format. In FIG. 6, an example of the text representation is illustrated. In the AIT, an application ID (application-Identifier) for specifying the application, a control code (controlCode) for controlling an application state, location information (location) for indicating a storage position (storage place) of an application, etc. are described.

[2.2.2 Dissemination of Application Cooperating with AV Contents]

In the dissemination of the application cooperating with the AV contents, there are a case in which the AIT is multiplexed into the AV contents to be transmitted in a Moving Picture Experts Group (MPEG)-2 transport stream (TS) and a case in which separate AIT information is transmitted. By transmitting the AIT in cooperation with the AV contents, the life cycle control such as a start of an application cooperating with a broadcast program or a start of a dynamic application cooperating with progress of a program is possible in the receiver.

As a dissemination method, for example, there are (1) addition of an elementary stream (ES) for the AIT, (2) addition of a descriptor for an event information table (EIT), (3) transmission in a carousel type, (4) acquisition of an AIT file in communication, (5) transmission of a dynamic AIT file in communication, etc.

In the case of (1) addition of the ES for the AIT, the ES of the AIT is multiplexed into a broadcast TS as specified in the ARIB-J.

In the case of (2) addition of the descriptor for the EIT, as in representation control as will be described later, a descriptor for the EIT (present/follow (p/f)) is added and the same information as that to be transmitted in the AIT is transmitted.

In the case of (3) transmission in the carousel type, the AIT is transmitted in a digital storage media command and control (DSM-CC) data carousel. For example, the AIT file is transmitted in a specific module. Although the overhead of an acquisition time is assumed by performing the transmission in the carousel type, it is not necessary to change a current broadcast signal.

As an operation example of the carousel, a component tag of a carousel for broadcasting/communication cooperation start file transmission and a module are fixed. For example, "AA" is set in the component tag, "0000" is set in a module ID, and a type indicating that there is an AIT is set in a type descriptor of the module. The receiver monitors an update of the module, reads the AIT again upon detecting the update, and executes control designated according to the AIT (life cycle control of the application).

In the case of (4) acquisition of the AIT file in the communication, a separately prepared AIT file is acquired simultaneously with selection of the AV contents. For example, the two are acquired based on information in which information (a contents ID) of the AV contents to be reproduced and application start information (AIT) are described. It is possible to use an idea of use unit contents of server type broadcasting (ARM TR-B27) or an entry component.

In the case of (5) transmission of a dynamic AIT file in communication, control of starting a new application or ending an application during the start while the AV contents are reproduced is performed according to the AIT transmitted by communication. When control is performed at a timing not assumed in advance, notification is performed according to a push via communication.

[2.2.3 Dissemination of Application which Operates Independently]

The receiver acquires the AIT including start information of an application which operates independently through communication. The independent application is acquired from a known application repository. A procedure until start information of an individual independent application is acquired is shown as follows.

(1) A location of the application repository is set in the receiver. The location may be preset at a factory and a plurality of repositories may be added later through any method.

(2) When an application menu is open, the receiver acquires a list of applications (including a location description of an AIT of each app), and displays the app in the menu.

(3) The AIT of an application selected by the viewer is acquired from communication.

The above-described procedure is executed using a WEB API provided by the repository. In addition, because an application that operates independently does not operate in cooperation with the AV contents, dynamic life cycle control at a preset timing is not performed. The control (end or the like) at a timing not designated in advance is performed according to a notification by a push via communication.

[2.3 Start and End of Application]

[2.3.1 Life Cycle of Application]

[2.3.1.1 Life Cycle]

Figure 7:
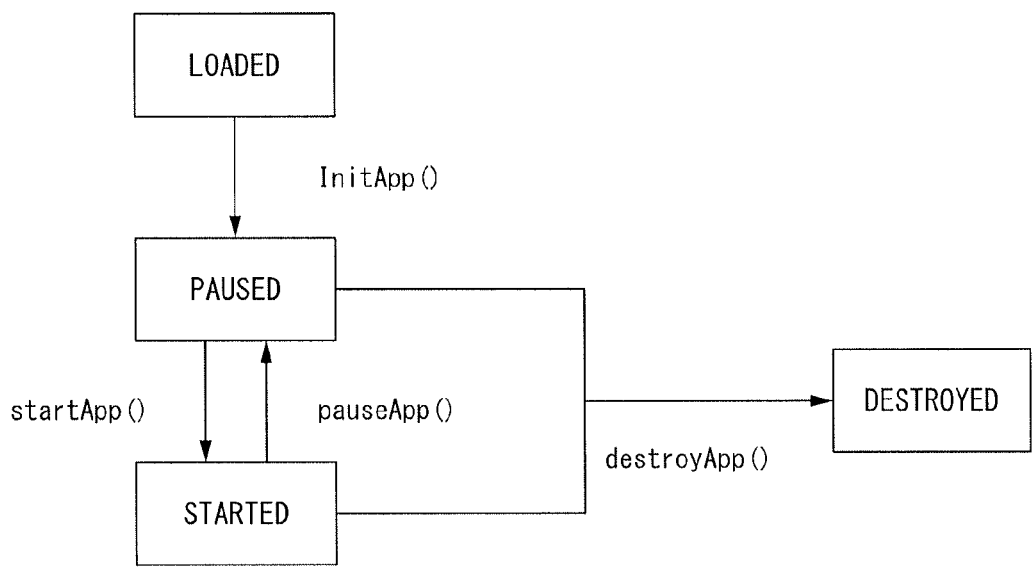
FIG. 7 is a diagram illustrating a life cycle of an application in the broadcast communication cooperation system.

FIG. 7 is a diagram illustrating a life cycle of an application.

Application states are based on those in ARIB-J, and are five states of "Not Loaded (before loading)," "Loaded (after loading)," "Paused," "Started," and "Destroyed." In these five states, a series of processes until the application is loaded, executed, and ended are referred to as a life cycle of the application, and control of the transition between states is referred to as life cycle control.

[2.3.1.2 Basic Life Cycle Control of Application Cooperating with AV Contents]

The control of the life cycle of the application cooperating with the AV contents is based on the fact that the control is performed through selection of a stream-dependent service.

The viewer selects the stream-dependent service. The service is a set of a series of pieces of contents including AV contents or an application, and a life cycle such as a start or an end is controlled using a control code included in an AIT to be transmitted along with the application. A plurality of applications may be included in one service and operate at the same time.

When the service selection serving as a trigger of an application start is controlled from an application through a receiver API or controlled from a navigator serving as a resident application of the receiver, a remote button may be controlled in the case of a broadcast service. At the time of service switching, presentation of contents (AV contents or applications) included in services before and after the switching is switched. When applications included in the services before and after the switching are different, the application started before the switching ends through service switching and a different application can start after the switching. Details of these operations will be described later in Section 2.4.

[2.3.2 Start of Application]
[2.3.2.1 Start by AIT]

When the service (stream-dependent service or independent service) has been selected in the receiver, an application in which "auto-start" has been designated automatically starts along with the service selection without explicit action from the viewer in a control code included in an AIT provided along with the service. During the service selection, the life cycle is controlled by application signaling for the service. For example, in the case of the broadcast service, the receiver constantly monitors the AIT transmitted along with the broadcast and copes with its changes. In this manner, it is possible to control a new application in the receiver to auto-start in the middle through application signaling such as transmission of the AIT.

In application start information according to the AIT, an application in which "auto-start" is not designated is not automatically started but needs to be explicitly started by the viewer. This explicit start is performed by an application launcher of a resident application of the receiver. For example, at the time of broadcast service selection, by pressing a broadcasting/communication cooperation service button of a remote controller, a menu for starting the application in the receiver is opened and a list of applications cooperating with a current broadcast (communication) service is displayed. Here, the viewer performs an operation of selecting/starting a desired application to be started for the receiver.

[2.3.2.2 Start from Broadcasting/Communication Cooperation Application]

Because it is possible to start a plurality of applications within a service, another application included in the same service from the started application may be started. In an ARIB-J application execution environment, an API for starting another application is specified by designating an application ID. Even in the case of another execution environment, an API having a similar function is specified.

[2.3.2.3 Start from Broadcast Markup Language (BML)]

Because the receiver includes an execution environment of a current BML data broadcast in addition to a broadcasting/communication cooperation application execution environment, an API for controlling the start of the broadcasting/communication cooperation application is added as an API of the BML. The BML is a multimedia encoding scheme specified in ARIB STD B24, and is adopted as a data broadcasting scheme in current Japanese terrestrial/broadcast satellite (BS)/communication satellite (CS) digital broadcasting.

[2.3.2.4 Start of Application which Operates Independently]

An independent service is a virtual service including only an application, and the application is started by acquiring an AIT according to the same mechanism as in the start according to the AIT of Section 2.3.2.1 by selecting an independent application. However, in the independent service, at least one auto-start application starts. The selection of the independent service, for example, is performed from an application launcher.

[2.3.3 End of Application]
[2.3.3.1 End by AIT]

In the started application, a life cycle is controlled by application signaling for its service. For example, in the case of the broadcast, the receiver constantly monitors the AIT transmitted along with the broadcast and designates control code destroy for the application during the start, thereby ending the application. Even when the AIT is multiplexed into the stream-dependent service to be transmitted in communication, cooperation application end control is possible.

[2.3.3.2 End by Application Itself]

The application ends itself using an end API.

[2.3.3.3 End by Other Application]

Using the application end API to be executed by the application, the other application is caused to end during the start. In this case, an appropriate security policy for ending the other application is necessary.

[2.3.3.4 End at Time of Switching to Separate Service]

At the time of switching to the separate service in the receiver, an application included in the service before the switching among applications included in the stream-dependent service ends, and an application signaled in a new service starts. When the same application is included in the services before and after the switching, it is also possible to continue the operation. This is controlled in a graph in the AIT. Details of a service bound application which is an application included in a stream-dependent service will be described later in Section 4.2.

[2.3.3.5 End by Receiver]

The receiver ends the designated application according to a reception function. For example, the receiver displays an application list during the start, and ends an application of designation through selection of the viewer.

[2.3.3.6 Dynamic Application End]

To dynamically control the end of the application, a file of the AIT indicating the end of the application is transmitted to the receiver. In this case, an application notification of the AIT is provided.

[2.3.4 Start of Plurality of Applications]
[2.3.4.1 Application Signaled within Same Service]

The receiver can simultaneously execute applications listed in the AIT in the same service.

[2.3.4.2 Simultaneous Start of Applications that Operate Independently of Application Cooperating with AV Contents]

The application cooperating with the AV contents starts only within the stream-dependent service. On the other hand, the application that operates independently can operate simultaneously with an application cooperating with the AV contents or another application operating independently at an arbitrary timing.

[2.3.4.3 Resource Management Upon Starting Plurality of Applications]

When the plurality of applications start, they may require a resource (for example, a display) of the same receiver. The receiver performs an operation of appropriately allocating a resource by including a mechanism such as a resource manager or stopping the execution of an application when no resource is available or the like.

[2.4 Boundary of Application]

[2.4.1 Bound/Unbound Basic Treatment]

There are two types of applications including a bound application linked (associated) with an organization service and an unbound (unassociated) application. An organization service linked with the bound application is determined by the organization service from which the AIT including application start information is obtained.

The bound application is in an executable state when a linked organization service is received. That is, the bound application is started by the AIT from the organization service and ended when reception of the organization service has ended (the received organization service has been changed). Another application started from the bound application is also treated as a bound application. When an initially started application that is a base of a series of associated bound application groups ends, another application started by the initially started application also ends.

Because the unbound application is not linked to the organization service, the execution of the application continues even when the received organization service is changed. Because it is difficult to obtain the AIT for starting the application from the organization service, another means (for example, a process of obtaining an AIT file linked to the application using an application launcher or the like) provides start information to the receiver, and a start operation is performed. A separate application started from the unbound application is also treated as an unbound application. Although a process in which the application explicitly ends according to an operation of the viewer is basic, the application also ends when an instruction (KILLALL) for ending all applications from a received organization service is given by the AIT.

[2.4.2 Treatment Unique to Unbound Application]

Although the unbound application is not linked to the organization service, the same start processing mechanism as in the bound application is applicable by linking it to a virtual organization service (generated within the receiver when the receiver starts) as shown in Section 2.3.2.4.

A method of generating a virtual organization service depends upon implementation of the receiver, and an identification value given to the organization service differs according to the implementation of the receiver. However, when a start process is enabled from an application launcher at an arbitrary timing at which an application file is accumulated within the receiver, it is necessary for the receiver to update contents of the AIT so that an ID for identifying the virtual organization service, an application file acquisition destination (a change is necessary for acquisition from an accumulation region within the receiver because the service is described as an acquisition destination in the AIT acquired from the service provider server or the repository), etc. conform to the receiver implementation.

[2.5 Application Acquisition Method]

[2.5.1 Acquisition Based on AIT]

As described above, start information of all applications is given by the AIT.

The acquisition of the application file is indicated by location information of the application included in the AIT. For example, the location information in the example of FIG. 3 is described in a layer of "/ApplicationList/Application/applicationSpecificDescriptor/dvbjDescriptor/location" (described as contents of a location element in XML). The description of the location information, for example, is http://192.168.11.37/demo.jar.

The above description is an example in which demo.jar (an application archive of Java (registered trademark)) is acquired using a hypertext transfer protocol (HTTP). A transport protocol or an application package format to be used will be described later.

[2.5.2 Package Format of Application]

The package format of the application depends upon an application format (Java (registered trademark) or hypertext markup language 5 (HTML5) or the like. The receiver acquires a series of files (a program main body, an image file, or the like) necessary to start the application by acquiring a file serving as a lump or an entry file. This series of files is an application file. For example, in the application file, formats such as a file (a zip file or the like) obtained by compressing a series of files, a Jar file (Java (registered trademark) execution environment), an entry HTML file (in the case of the HTML5 execution environment), and an independently specified entry file are used.

[2.5.3 Application Transmission Method]

In a transmitting method when an application file is acquired via a network, there are acquisition by an HTTP protocol and acquisition by an FILE protocol.

In the case of the acquisition by the HTTP protocol, the acquisition is performed by a GET method. The location designation of the AIT is set as http://~.

On the other hand, in the case of acquisition of the FILE protocol, the location designation of the AIT is set as "file:///~" when an application file (application program) locally saved (installed) in the receiver is designated.

[3. I/F Conditions]

[3.1 Broadcasting/Communication Cooperation Service Control Signal of Broadcast Waves]

In the broadcast waves, the mechanism for transmitting application start information described in Section 2.2.2 is necessary. Further, in order to forcibly end all applications by assuming an early warning system (EWS) time or the like, "KILLALL" is added to an application control code (application_control_code) of the AIT specified in ARIB STD-B23 Part 2 Section 10.16.3.2. Table 1 shows the description of the added control code "KILLALL."

TABLE 1

| Code | ID name | Description |
| --- | --- | --- |
| 0x08 | KILLALL | All applications end regardless of cooperation/non-cooperation. In ARIB-J, a destroy method is called within Xlet in a state in which an unconditional parameter is true. In an HTML5 browser, etc., the browser forcibly ends without displaying a dialog for asking a user about permission/denial of the end. |

In addition, in order to control the presentation of the application from the relationship between the application and AV contents, a descriptor is added to EIT and AIT. Details will be described later in Section 4.3.

[3.2 Broadcast Station Server Group API]

Figure 8:
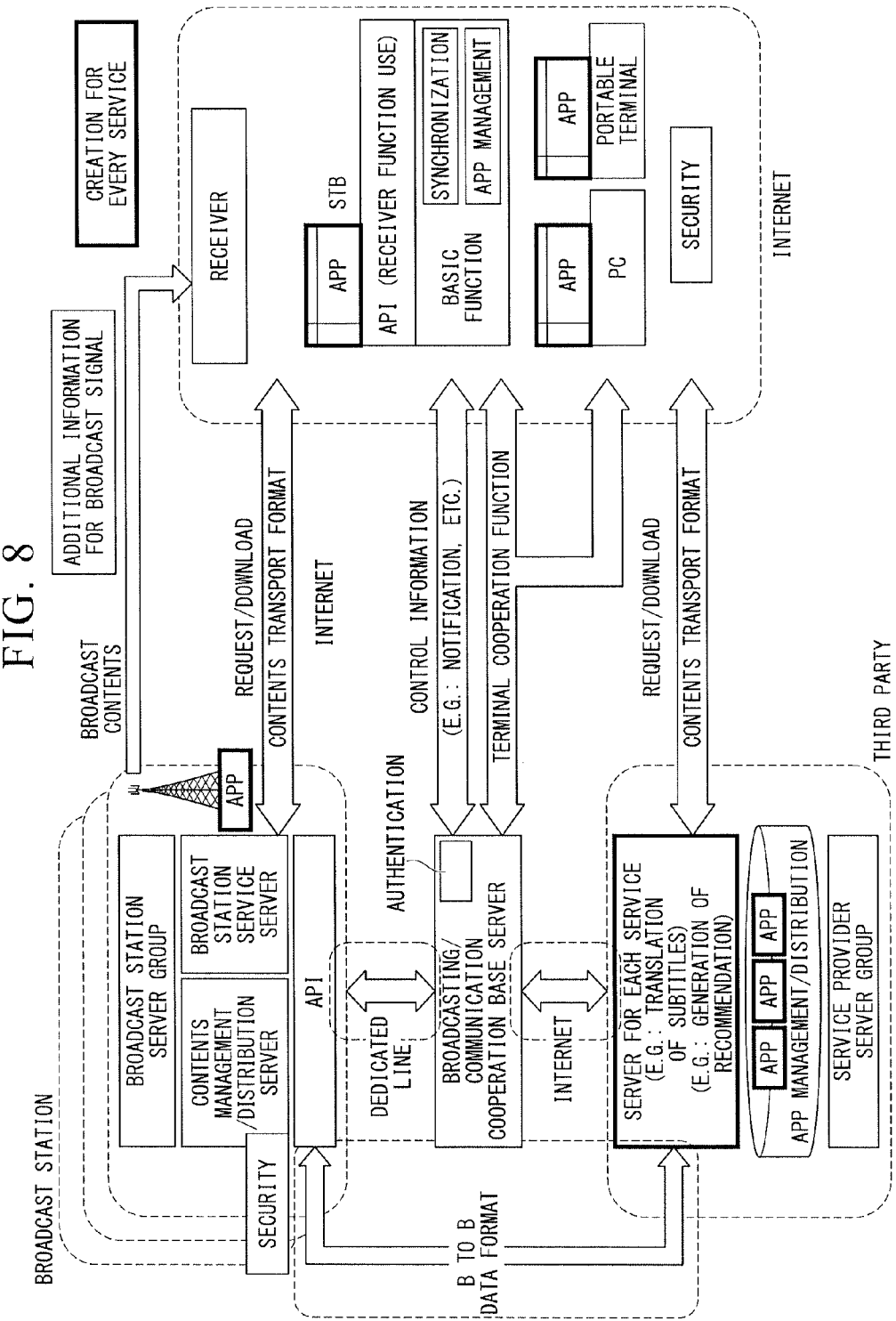
FIG. 8 is a diagram illustrating flow of data between providers in the broadcast communication cooperation system.
Figure 9:
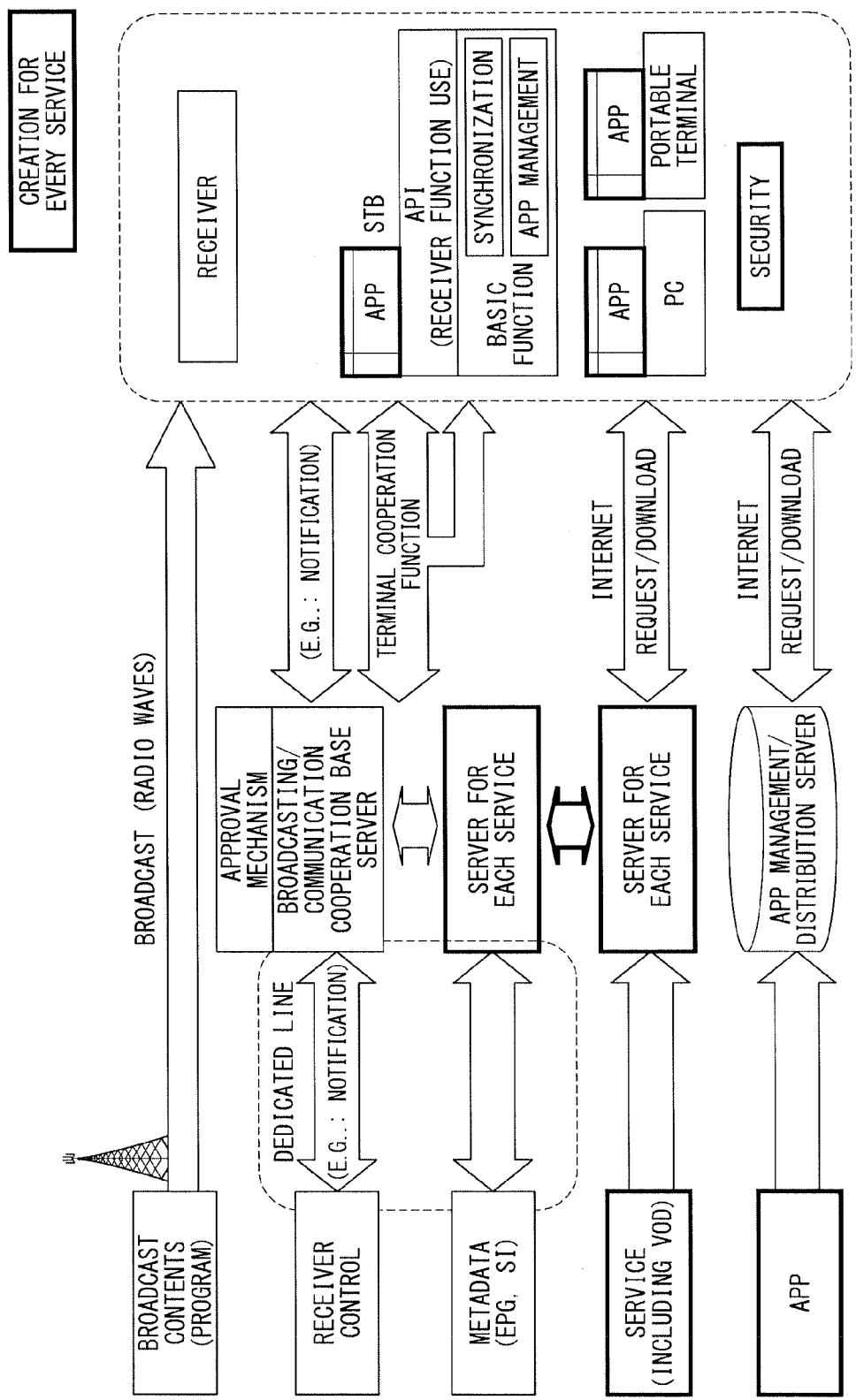
FIG. 9 is a diagram illustrating flow of data in the entire broadcast communication cooperation system.

FIG. 8 is a diagram illustrating a flow of data between providers in the broadcasting/communication cooperation system, and FIG. 9 is a diagram illustrating a flow of data in the overall broadcasting/communication cooperation system.

Here, a process of specifying APIs between a broadcast station server group and a server of each service of a service provider server group, between the broadcast station server group and a broadcasting/communication cooperation base server, and between the broadcasting/communication cooperation base server and the server of each service of the service provider server group illustrated in FIG. 8 and APIs between receiver control and a broadcasting/communication cooperation base server and between metadata and a server of each service illustrated in FIG. 9 will be described later.

[3.2.1 API]

Communication between a broadcast station server which is each server constituting a broadcast station server group and a service provider server which is each server constituting a service provider server group is performed in the format of REST. In addition, because a directory configuration of a server is expected to differ according to a service to be provided between the broadcast station server and the service provider server, an API is determined between the two sides. An example of URLs of the broadcast station server and the service provider server will be shown hereinafter.

http://hybridcast.org/{broadcast station name}/{server name}/{content ID}/{data to be managed}/{sort method}/{first item},{number of pieces}/?{parameter}={value}/

[3.2.2 Recommendation Service]

Figure 10:
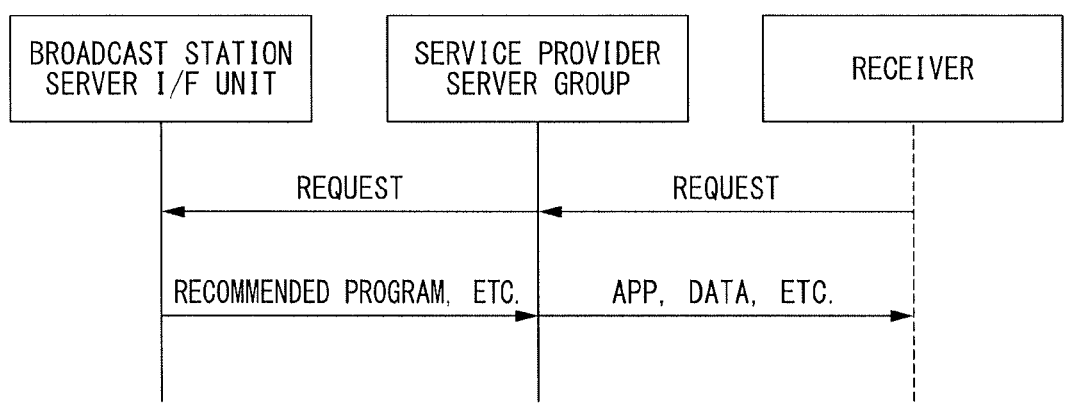
FIG. 10 is a diagram illustrating a sequence of a recommendation service in the broadcast communication cooperation system.

FIG. 10 is a diagram illustrating a sequence of a recommendation service. Methods used between the service provider server group and the I/F unit of the broadcast station server are "GET," "POST," "PUT," and "DELETE." An example of a command format is shown hereinafter.

(1) http://hybridcast.or.jp/{broadcast station name}/(server name)/{content ID}/{data to be managed}/{sort method}/{first item},{number of pieces}/

(2) http://hybridcast.or.jp/{broadcast station name}/(server name)/{viewer ID}/{data to be managed}/{sort method}/{first item},{number of pieces}/

(3) http://hybridcast.or.jp/{broadcast station name}/(server name)/{review ID}/{data to be managed}/{sort method}/{first item},{number of pieces}/

In addition, parameters are {broadcast station name}, {server name}, {content ID}, {viewer ID}, {review ID}, {data to be managed}, {sort method}, {first item}, {number of pieces}, etc.

[3.2.3 Data to be Managed]

The data to be managed is contents information, user information, user-generated contents information, device information, and authentication information.

The contents information includes data representing a title, an outline, a genre, a broadcasting date, a broadcasting time (scale), a video mode, an audio mode, subtitle data, a script, a performer, music, a producer, a production company, a copyright, a recommended program, a moving-image uniform resource identifier (URI), the number of reproductions, a commercial message (CM), timestamp information, etc. The user information includes data representing a name, age, sex, a region, the number of review writings, the number of comment writings, favorites, a friend list, a reproduction place (time), a reproduction end place (time), a program viewing history of a user (viewer), etc. The user-generated contents information includes data representing a contents ID, a user ID, review contents, a review writing time, review evaluation, etc. The device information includes a device ID. The authentication information includes an authentication ID.

[3.3 Transport Format]

[3.3.1 Video/Audio to be Handled in Communication]

The video or audio to be handled in communication is based on protocol edition V1.1 (Digital TV information Research) of a streaming function spec among digital TV network function specs.

[3.3.1.1 Relationship with Mono-Media Format of Video/Audio]

A time-stamped transport stream (TTS) format is used to multiplex video encoded by MPEG-2 Video or H.264/MPEG-4 advanced video coding (AVC), audio encoded by MPEG-1 Audio Layer II or MPEG-2 Audio advanced audio coding (AAC), subtitles, etc. However, MPEG2-TS, MPEG media transport (MMT), MP4, etc. are also available.

[3.3.1.2 Transport Protocol Relationship]

Figure 11:
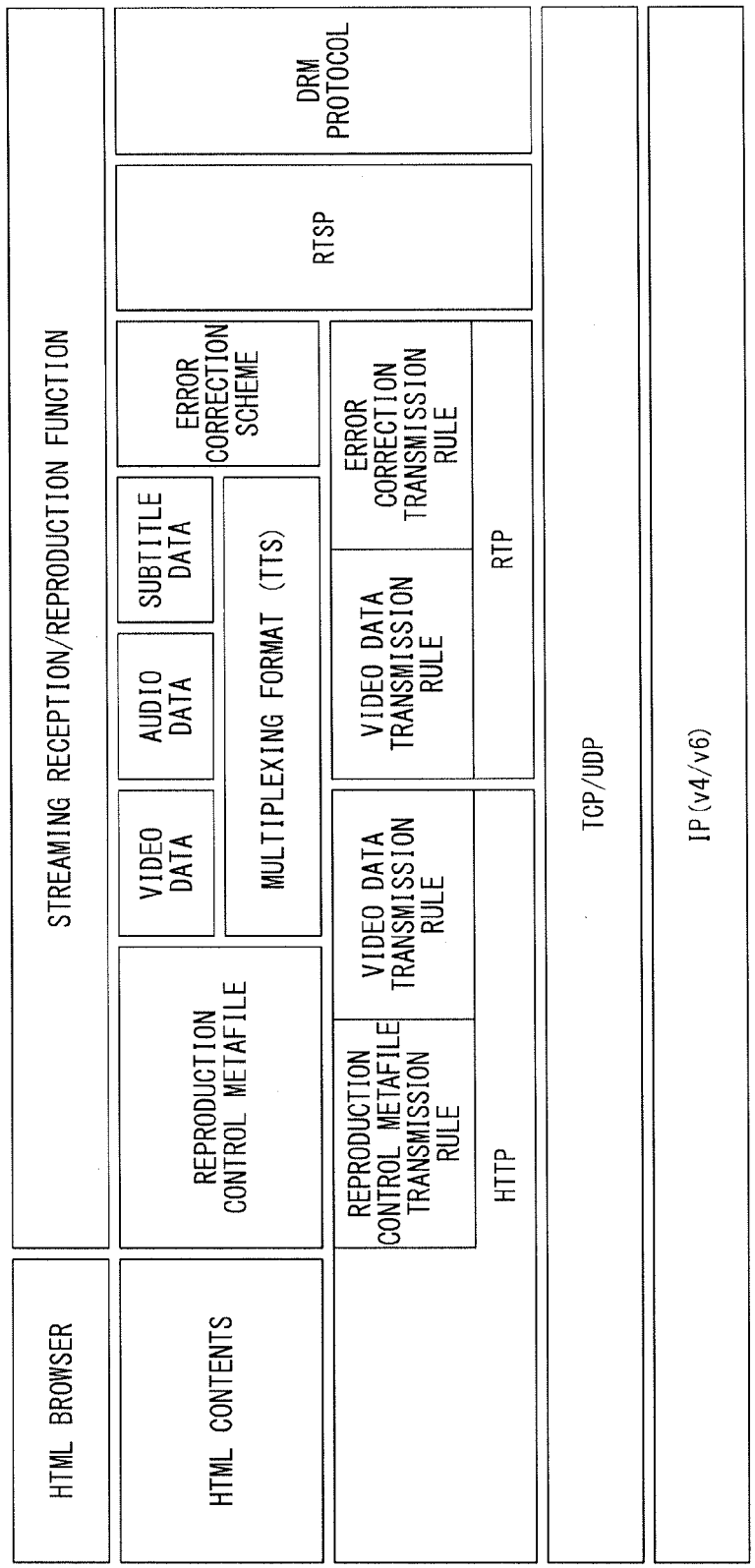
FIG. 11 is a diagram illustrating a transmission protocol stack in the broadcast communication cooperation system.

FIG. 11 is a diagram illustrating a transmission protocol stack.

Stream transmission uses a real-time transport protocol (RTP)/user datagram protocol (UDP) and an HTTP/transmission control protocol (TCP). When the RTP/UDP is used, error correction information may be transmitted as an option. In addition, when the HTTP/TCP is used, stream control is performed using a connection, a method, and a header of the HTTP. When the transmission is performed in the RTP, stream control information uses a real time streaming protocol (RTSP).

[3.3.2 Subtitle Relation]

Multilingual subtitles are based on Timed Text Markup Language (World Wide Web Consortium (W3C)). Synchronization is executed at a separate application level. In addition, each corresponding font is downloaded according to need from the server. For example, a font file is placed in an HTTP payload. In this case, dynamic fonts of a web and a portable font resource (PFR) are used.

It is desirable for a font capacity to be about 5 to 35 megabytes (MB).

[3.4 Mono-Media Format]

The following defined encoding is used as mono-media encoding in the broadcasting/communication cooperation service.

[3.4.1 Moving Image]

In the moving image, a constraint condition of an encoding parameter of a TV service specified in Section 5.1 of ARIB STD-B32 Version 2.4 Part 1 in which an MPEG-2 Video scheme specified in Section 3.1 of the same and an MPEG4-AVC scheme specified in Section 3.2 of the same are used is applied.

[3.4.2 Audio]

MPEG-2 Audio or pulse code modulation (PCM) (Audio Interchange File Format compression (AIFF-C)) is used in the audio.

In the case of MPEG-2 Audio, a constraint condition of an encoding parameter specified in Chapter 5 of ARIB STD-B32 Version 2.4 Part 2 in which an MPEG-2 AAC scheme specified in Section 3.1 of the same is used is applied.

In the case of PCM, a scheme specified in ARIB STD-B24 Version 5.4 Volume 1 Part 2 Section 6.2 is used.

In an additional sound, a scheme specified in ARIB STD-B24 Version 5.4 Volume 1 Part 2 Section 6.4 is used.

[3.4.3 Still Image]

In the case of Joint Photographic Experts Group (PEG), an encoding scheme specified in ARIB STD-B24 Version 5.4 Volume 1 Part 2 Section 5.2 is used.

In the case of Portable Network Graphics (PNG), a scheme specified in International Organization for Standardization/International Electrotechnical Commission (ISO/IEC) 15948: 2003 is used. This is the same contents as in W3C Recommendation PNG Specification (Second Edition).

[3.4.4 Characters]

In character encoding, a universal encoded character set specified in ARIB STD-B24 Version 5.4 Volume 1 Part 2 Section 7.2 is used.

In a character code set, a Basic Multilingual Plane (BMP) set specified in Section 7.2.1.1.3 of the same is used and Table 7-20 is applied. In addition, Supplements 5 and 6 of ISO/IEC 10646: 2003 are applied.

A scheme specified in ARIB STD-B24 Version 5.4 Volume 1 Part 2 Section 7.2.1.2, a scheme specified in ARIB STD-B23 Part 1 Section 5.2.1.2, etc. are applied to external characters.

In control codes, only APR (CR) and APD (LF) are used among C0 control codes specified in ARIB STD-B24 Version 5.4 Volume 1 Part 2 Section 7.2.2.1. Other C0 and C1 control codes are not used.

Character code conversion follows ARIB STD-B24 Version 5.4 Volume 1 Part 2 Annex E.

When information is encoded in a scheme other than a character encoding scheme specified in the above description, conversion is performed in the above-described character encoding scheme in transmission or an appropriate process within the receiver and a process is performed. That is, character encoding by another encoding scheme is not directly handled from an application.

[3.5 Application Format]

A method of describing an application executable on the receiver is shown. A combination of an execution environment for executing an application created by the description method and a secure manager is shown in Chapter 4.

[3.5.1 Application Format Executable in Receiver]

As a scheme of describing an application executable in the receiver, BML (ARIB STD-B24), ARIB-J (ARIB STD-B23), and HTML5 (W3C HTML5 Working draft—2011/Jan/13) are specified.

[3.5.2 BML]

The receiver has a function of presenting a BML document based on operational guidelines for terrestrial digital broadcasting (ARIB TR-B14) or operational guidelines for BS digital broadcasting (ARIB TR-B15).

The receiver should be able to present a data broadcast service provided by terrestrial digital broadcasting or BS digital broadcasting as in an existing standard. However, the receiver includes only the presentation of BML contents distributed according to a data carousel scheme in broadcasting as essential presentation, and does not include the presentation of BML contents (TR-B14 Volume 3 Part 2 Section 5.14 or TR-B15 Volume 3 Part 1 Section 8.14) provided according to the HTTP protocol in communication as essential presentation.

In addition, browser.startHybridcastApp( ) and getAITInfo( ) are specified as broadcast extension APIs for starting the following specified communication application based on data broadcast contents (BML).

Table 2 shows the provision of browser.startHybridcastApp( ).

browser.startHybridcastApp( ) is an API for starting a broadcasting/communication cooperation application.

TABLE 2

| Grammar | Number startHybridcastApp(input String applicationURL, input Number applicationType, [input String returnURL]) |
|---|---|
| Argument | applicatoinURL: URL of an application |
| | applicationType: Constant indicating a type of application |
| | returnUTL: Return when an application ends |
| Return value | Value representing an execution result |
| Description | The presentation of a BML document ends according to execution of this function, and the presentation of the designated application starts. |

Table 3 represents the provision of getAITInfo( ). getAITInfo( ) is an API for acquiring the latest AIT information included in the service during reception.

TABLE 3

| Grammar | Array getAITInfo(out Array) |
|---|---|
| Return value | Array[0]: Value representing an acquisition result. |
| | Array[1]: Array (*1) storing information of an application 1 |
| | Array[2]: Array storing information of an application 2 |
| | Array[n]: The following is iterated |
| | *1) The format of Array storing application information is as follows. |
| | Array[0]: Application ID |
| | Array[1]: URL of an application |
| Description | Latest AIT information included in a service during reception is acquired. |

[3.5.3 HTML5]

[3.5.3.1 Description Method]

The receiver supports HTML5 as the description scheme of a presentation engine type application to be provided from communication. As JavaScript (registered trademark) API, the following is supported. Among the following APIs, working draft (WD) or editor's draft (ED), which are being investigated by the W3C, are included. However, an API associated with a data carousel transmitted by broadcast waves is not essential.

(1) System Information API (W3C Working Draft 2 Feb. 2010)

(2) WebSocket API (W3C Editor's Draft 28 Feb. 2011)

(3) File API (W3C Working Draft 26 Oct. 2010)

(4) Permission for File API, System Information API (Permissions for Device API Access, W3C Working Draft 5 Oct. 2010)

(5) Device Description Repository Simple API (W3C Recommendation 5 Dec. 2008)

(6) API for Media Resource 1.0 (W3C Working Draft 8 Jun. 2010)

(7) Web Storage (W3C Working Draft 8 Feb. 2011)

(8) Server-Sent Events (W3C Editor's Draft 28 Feb. 2011)

(9) Indexed Database API (W3C Working Draft 19 Aug. 2010)

(10) SI Access API

(11) Channel selection API

(12) Print

(13) Reserved

[3.5.3.2 Browser]

An HTML5 browser of the receiver implements functions of a JavaScript (registered trademark) processing system, Web Workers (W3C Working Draft 8 Feb. 2011), Widget Interface (W3C Working Draft 3 Feb. 2011), and HTML Canvas 2D Context (W3C Editor's Draft 28 Feb. 2011). The web workers are necessary to support multitasking, the widget interface is necessary to support an independent application, and the HTML canvas 2D context is necessary to support two-dimensional vector graphics.

[3.5.4 ARIB-J]

The receiver supports ARIB-J as the description scheme of an application execution engine type application to be provided from communication. In addition, DVB Bluebook A153 (GEM Media Synchronization API) is used as a synchronization API among a plurality of streams.

[3.6 Receiver API]

Hereinafter, the receiver API available in HTML5 and ARIB-J will be described.

[3.6.1 Namespace]

The namespace is a description rule of a character string for specifying positions of variable resources to be handled in a broadcasting/communication cooperation system such as video/audio contents, an application, and a mono-media file on the server or within the receiver. The notation of the namespace for referring to various resources used after Section 3.5.2 is specified for each classification. The resources are resources on an Internet server, resources on an application cache, and broadcast resources. The resources on the Internet server are stream resources such as VOD contents, an application, and file resources such as an application and other resources to be referred to from the application. The broadcast resources are stream resources such as a program during broadcasting and past and future programs and carousel resources such as a module and an event message.

[3.6.2 Broadcasting/Communication Cooperation I/Fs]

The broadcasting/communication cooperation I/Fs are the following I/Fs.

(1) getRunningApplications( ): Information of a running application is acquired. A return value of getRunningApplications includes apps[ ], application_id of each application, and running_level. In apps[ ], a list of running applications is set. In application_id, an application ID is set and is null when the application is unofficial. In running_level, an execution level (an authentication result and a state of a viewer setting) is set.

From a viewpoint of security, information capable of being acquired in relation to other applications should be limited.

(2) queryApplicationInfo( ): Information of a designated application is acquired.

(3) getProgramInfo( ): Information of a broadcast during reception is acquired. The return values are tuner_state, network_id, ts_id, orig_ts_id, service_id, event_id, and contents_id. In tuner_state, a value representing a reception state is set.

(4) getEPGInfo( ): Various information of EIT (+SDT) of a broadcast during reception is acquired.

(5) saveApplicationToCache( ): An application file on the server is saved on the cache.

(6) queryApplicationInCache( ): An application file (application program) is retrieved from the cache. Arguments of queryApplicationInCache( ) are application_id, getDSMCC-Module( ), addBroadcastSignalListener( ) and getListFromHybridcastMenu( ). In application_id, an application ID issued from an authentication authority is set. getDSMCC-Module( ) represents that a designated module is acquired from broadcast waves. addBroadcastSignalListener( ) represents that a listener for monitoring the update of SI, emergency information, a carousel, and an event message is registered. getListFromHybridcastMenu( ) represents that a list of top menu applications is acquired. Return values of queryApplicationInCache( ) are user apps[ ], broadcaster apps[ ], and vendor_apps[ ].

(7) addApplicationToHybridcastMenu( ): An application is added to the top menu.

(8) getKeyFromBroadcast( ): Key information for limited server access is acquired from a broadcast.

(9) querySupportedFunction( ): A function of an application browser is queried. This is used as the purpose of checking that a function/API is available.

[3.6.3 BroadacastSignalListener I/F]

The BroadcastSignalListener I/F is a listener I/F for monitoring SI, emergency information, a carousel, and an event message acquired from a broadcast. While a bound application is executed, this I/F event is generated even when a linked organization service has been changed.

[3.6.4 LocalDatabase I/F]

The LocalDatabase I/F is an I/F for holding/managing viewer information within the receiver. The viewer information is information which is not output to a server side, such as personal information, and is minimum information such as a viewer ID and a receiver ID.

[3.6.5 Synchronization-Related API]

As a SynchronizationManager I/F, the same API as DVB Bluebook A153 (GEM Stream Synchronization API) is introduced. Further, the following I/F is added as the API.

(1) getCurrentSTC( ): A current system time clock (STC) value is acquired. In the standard of MPEG 2 systems, the system clock (STC) inside the receiver is specified to be synchronized with the STC of a transmitting side by multiplexing and distributing the system clock (STC) of the transmitting side as a program clock reference (PCR) signal in an MPEG2 transport stream.

(2) getCurrentPositionInProgram( ): A passage time from a program start is acquired.

(3) delayStreamPresentation( ): The delayed presentation of a broadcast stream during presentation starts.

(4) getCurrentDelay( ); A delay time amount of a broadcast stream (from an original presentation time) during presentation is acquired.

[3.6.6 SecurityException I/F]

This I/F is an exceptional I/F generated when an application has performed function call and property operations prohibited at a current execution level. The SecurityException I/F is generated according to calling of each API described above or various operations on an object for referring to a broadcast (<video> for HTML5 and OO controller for ARIB-J).

[3.7 Receiver Function]

The receiver of the broadcasting/communication cooperation system includes an application launcher as the receiver function. The application launcher is used in the start of an application accumulated in the receiver, the selection of an independent application from a known repository, and the selection of an application in which a control code is "PRESENT" among applications in which a start instruction has been described according to the AIT.

[4. Security]

[4.1 Management of Broadcasting/Communication Cooperation Application]

In order to spread/activate the broadcasting/communication cooperation service while satisfying requirements of a broadcast provider, a framework in which a wide range of service providers or individuals as well as a broadcast provider and its related party can participate is necessary. In this broadcasting/communication cooperation system, applications are classified into "official applications" and "unofficial applications" from the viewpoint of security, and the two types of applications can be executed in the receiver.

Figure 12:
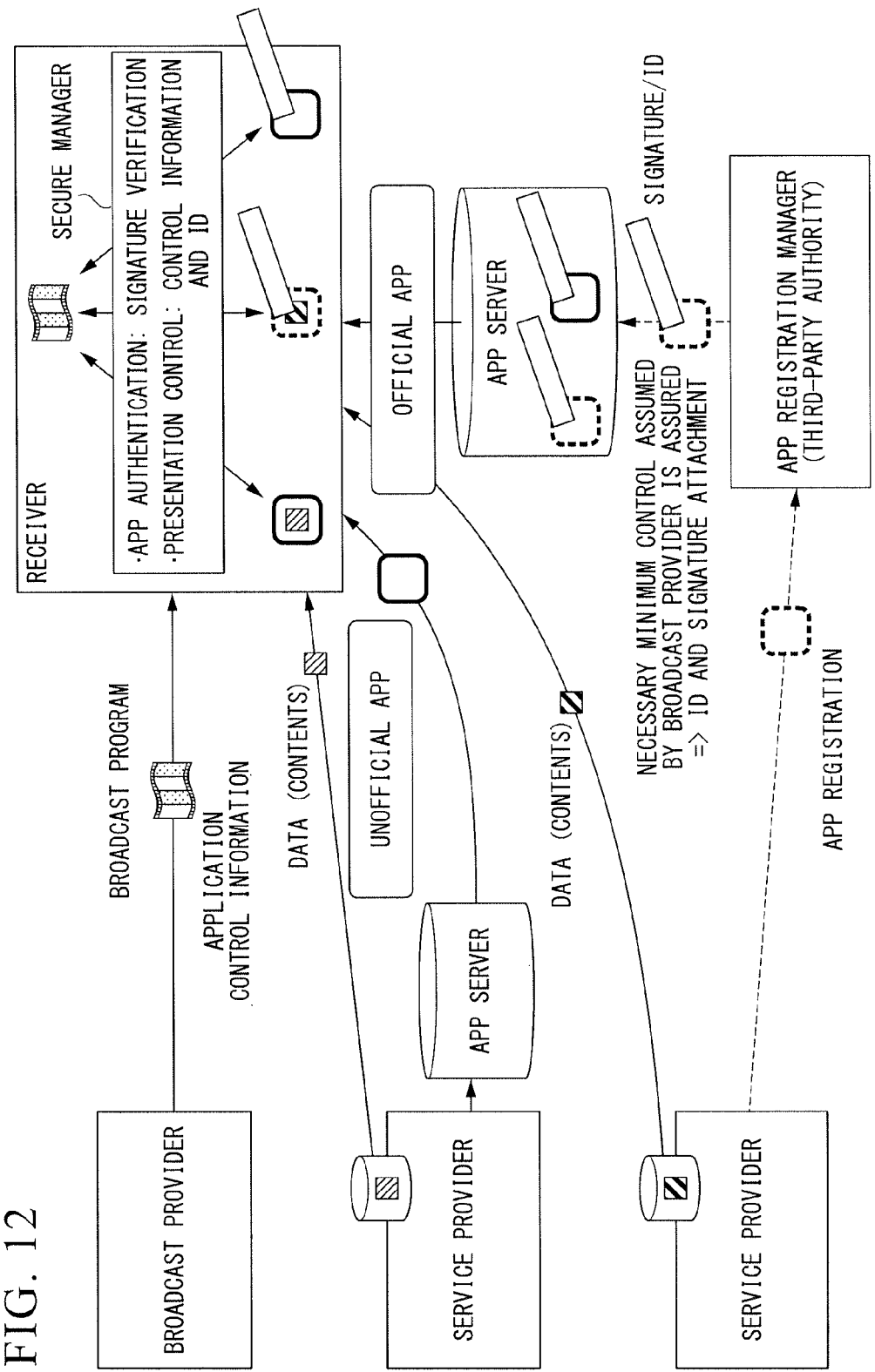
FIG. 12 is a diagram illustrating an application management model in the broadcast communication cooperation system.

FIG. 12 illustrates an application management model in the broadcasting/communication cooperation system. In the "official application," an operation expected in specs of the broadcasting/communication cooperation system is assured by performing pre-registration for a registration manager (third-party authority). The "official application" is configured so that an ID and a signature are given at a registration time, the signature is verified by a secure manager defined in Section 2.2 in the receiver, access to all APIs is possible, and a program cooperation service using a broadcast resource is provided. In addition, detailed presentation control according to requirements of the broadcast provider is enabled according to the AIT transmitted from the broadcast provider.

On the other hand, in the "unofficial application," pre-registration is unnecessary, but an operation expected in specs of the broadcasting/communication cooperation system is not ensured, and it is difficult to handle a broadcast-related API from the application. Because an ID and a signature are not given in the "unofficial application," it is difficult to designate an individual application, but it can be executed after a presentation limitation based on the requirements of the broadcast provider is applied.

[4.2 Functional Model of Security Manager]

Figure 13:
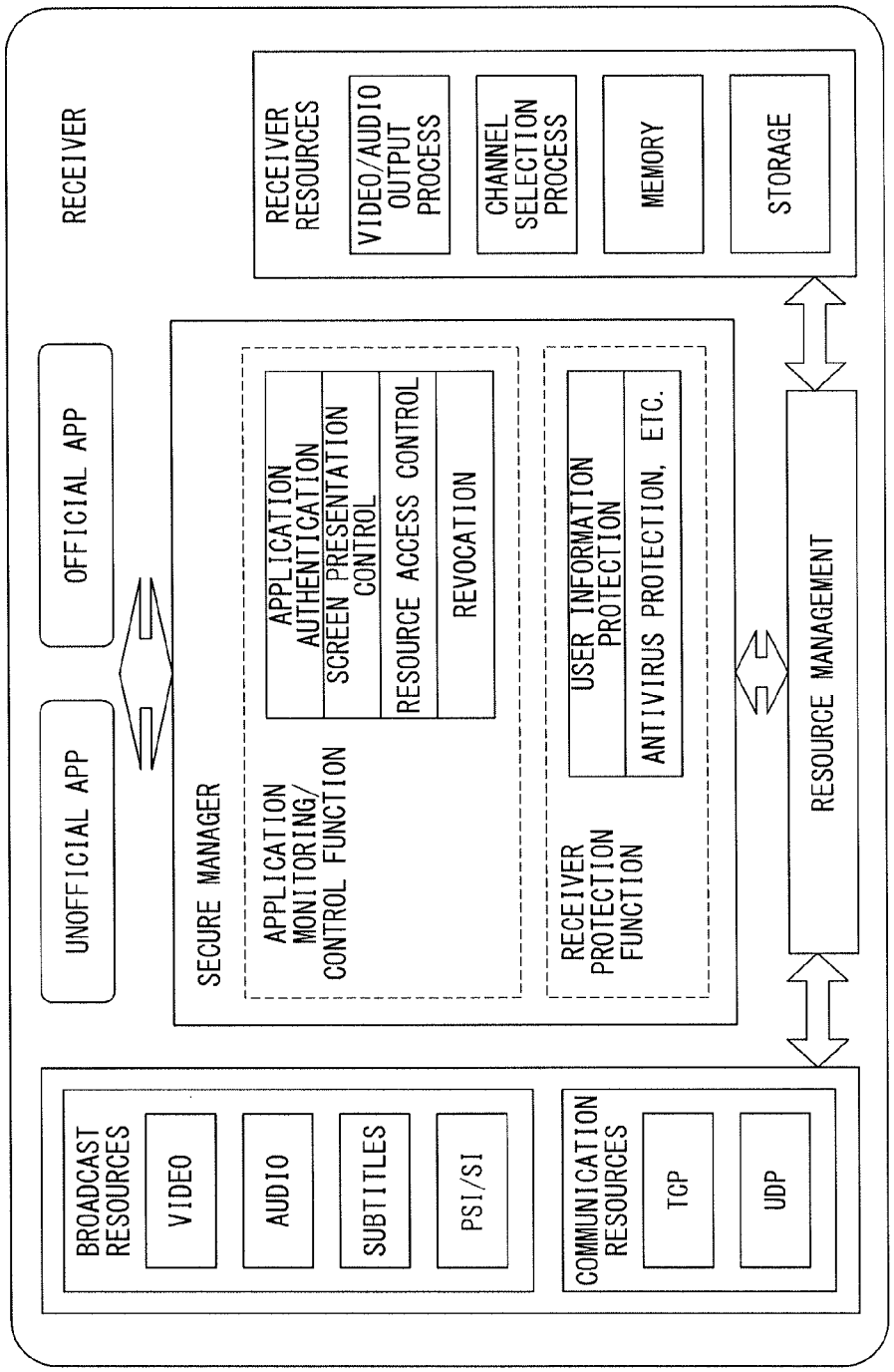
FIG. 13 is a diagram illustrating a functional model of a secure manager in the broadcast communication cooperation system.

FIG. 13 illustrates a functional model of a security manager. The security manager has a function of managing security in an integrated manner in the receiver.

[4.2.1 Application Monitoring/Control Functions]

The applications that operate in the receiver are roughly classified into two types of "official application" and "unofficial application" as described above according to a type of distribution of an application file. The "official application" and the "unofficial application" are distinguished according to the presence/absence of an ID and a signature as shown in Section 4.1, and operation contents at an application execution time are different such as that an access range of an API in the receiver or a control range from the broadcast provider is different. The application monitoring/control function has the purpose of identifying a difference in an official/unofficial type and reliably controlling an operation at the time of application execution.

(1) Application authentication: The receiver determines whether an application is official or unofficial for all applications to be executed, and further identifies an ID if the application is official. The distinction between the official and the unofficial is performed by checking and verifying the presence/absence of the signature assigned to the application file (application program). In the official case, the receiver further acquires an application ID described in the signature. The application is identified when the application is acquired or started.

(2) Screen presentation control: This will be described later in Section 4.3.

(3) Resource access control: The receiver performs access control for the API such as a broadcast resource of a running application. When the application is set to access the API, the access is limited according to a type of API if the application is the unofficial application.

In addition, when the application accesses a screen display API for a display, screen presentation control is executed based on an official or unofficial type and a presentation policy of a broadcast provider in process of channel selection. Details will be described later in Section 4.3.

(4) Revocation: A revocation function of the application is provided.

[4.2.2 Receiver Protection]

The receiver includes protection functions such as viewer information protection, antivirus protection, etc.

[4.3 Screen Presentation Control of Application]

[4.3.1 Outline of Screen Presentation Control]

In the broadcasting/communication cooperation service, it is possible to extend the convenience of a broadcast service by presenting a communication application simultaneously associated with a broadcast program. On the other hand, a process in which a broadcast program and a communication application are mixed and presented on the screen of the receiver using a communication service is assumed. According to the presentation method, there is concern that a communication application screen may overlap a broadcast program, uniqueness or work characteristics of a broadcast program may be lost, and information with high urgency such as an EEW may not be accurately transferred to the viewer. According to screen presentation control, application presentation control is performed based on an intention of the broadcast provider in the broadcasting/communication cooperation service.

Figure 14:
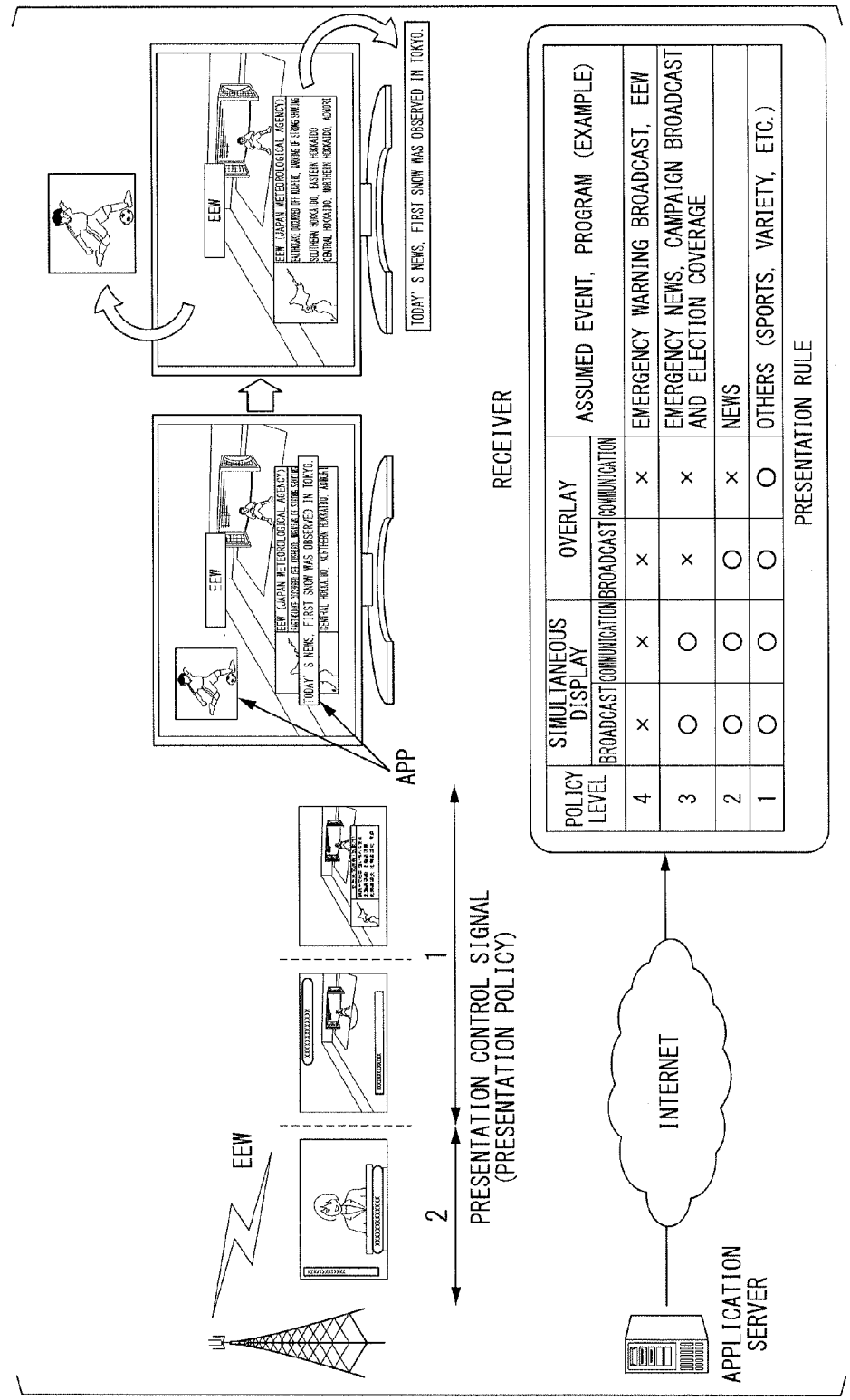
FIG. 14 is a diagram illustrating a concept of a screen presentation control scheme in the broadcast communication cooperation system.

FIG. 14 is a diagram illustrating a concept of a screen presentation control scheme. Because the screen presentation control scheme is intended to reflect a presentation policy of the broadcast provider representing a method of presenting a communication application on the screen for an individual broadcast program in the receiver, this is referred to as contents presentation control. In the contents presentation control, presentation control of a program unit corresponding to organization, presentation control for an event generated in a program such as an EEW, and presentation control of an application unit are implemented.

[4.3.2 Basic Operation of Screen Presentation Control]

Figure 15:
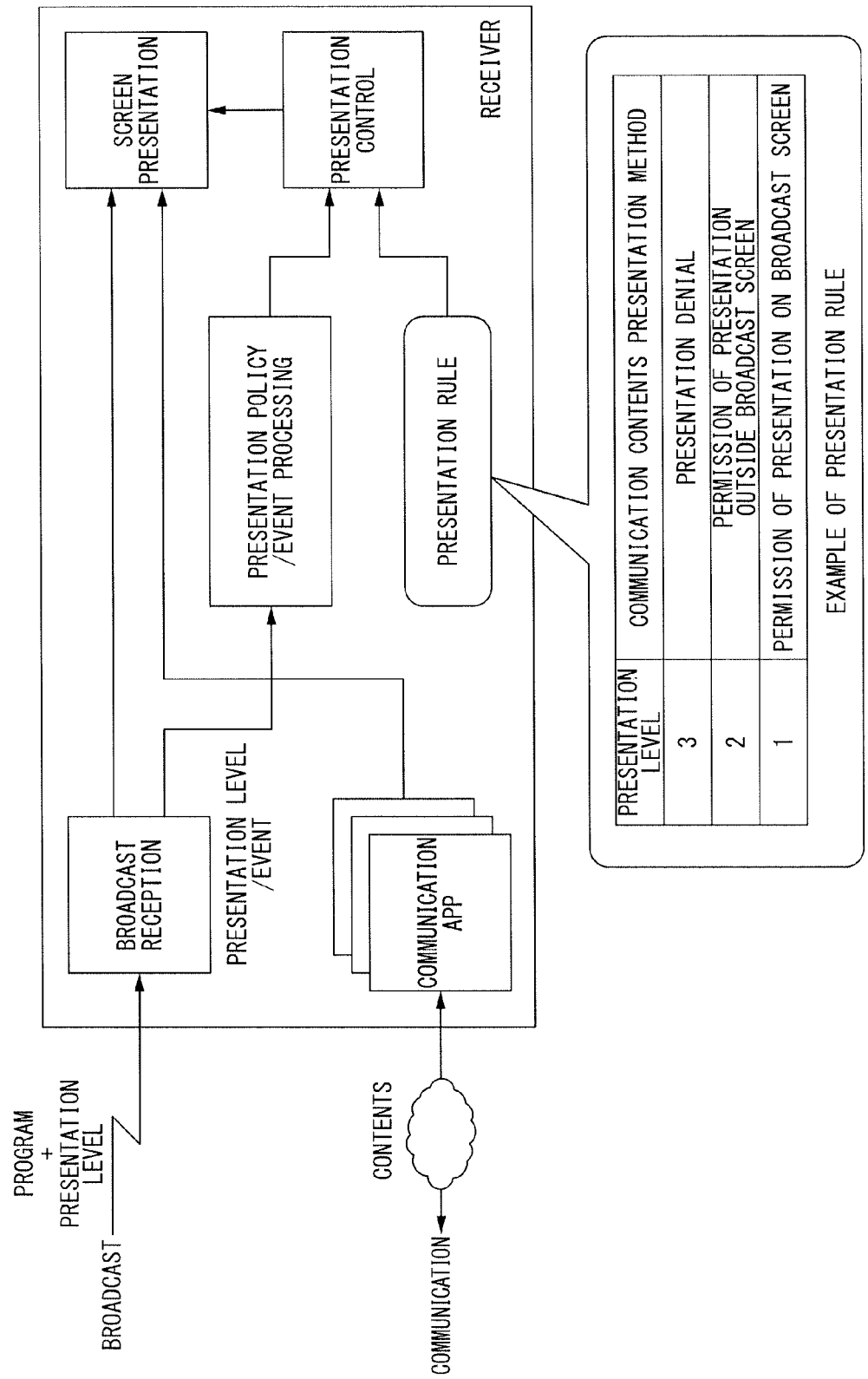
FIG. 15 is a diagram illustrating a basic process model of screen presentation control in the broadcast communication cooperation system.

FIG. 15 is a diagram illustrating a basic operation model of screen presentation control. In order to reflect the presentation policy of the broadcast provider in the receiver, a method of presenting communication contents for a broadcast program in which the broadcast provider has been assumed in advance is managed as a presentation rule in the receiver. Specifically, as a method of presenting communication contents, level classification is performed according to a difference in order of superimposition or an arrangement method, and a table of a presentation level (policy level) and a presentation method is held as a presentation rule within the receiver. The broadcast provider multiplexes a designated presentation level into broadcast waves to transmit a multiplexing result, and the receiver matches the presentation level with the presentation rule to determine a presentation method. Thereby, it is possible to implement presentation control based on a presentation policy of the broadcast provider.

[4.3.3 Control Information Transmission/Multiplexing Scheme]

In relation to a format of control information in which the presentation policy of the broadcast provider is transmitted, three specific examples are included as a scheme using program array information used in a digital broadcast. As screen presentation control in the program unit, there are a scheme using an existing event information table (EIT) and a scheme (EIT+) used by extending the EIT. In addition, there is a scheme used by extending the AIT of a broadcast signal as screen presentation control in units of services (channels). Further, there is a scheme using information transmitted from the broadcast station other than program array information as screen presentation control in an event unit generated in real time in a program. Hereinafter, details of four schemes will be described.

(1) EIT program genre (EIT): A policy level is determined from a program genre described in a content descriptor of an existing EIT. Because of this, the receiver manages a correspondence table of a program genre and a policy level. The relationship with the ARIB standard is shown in ARIB STD-B 10 Part 2 Section 6.2.4 Annex H.

Table 4 represents a specific example of a relationship between a program genre and a policy level. The program genre (program_genre) is configured in two steps of "contents_nibble_level1" (0x0 to 0xF) representing large classification and "contents_nibble_level2" (0x0 to 0xF) representing middle classification. The table managed in the receiver targets up to a genre of the middle classification, and defines each policy level value.

TABLE 4

| program_genre (contents_nibble_level1-contents_nibble_level12) | policy_level (1 to 4) |
| --- | --- |
| 0x0-0x0 | 3 |
| 0x0-0x1 | 1 |
| ... | |
| 0x0-0xF | 1 |
| ... | |
| 0xF-0xF | 1 |

(2) Addition of a new descriptor to the EIT (EIT+): A new descriptor is added to an event information section of the EIT, and policy information is described. The receiver implements control corresponding to a policy level in units of programs by analyzing the descriptor and executing a desired process. The relationship with the ARIB standard is shown in ARIB TR-B14 (Fascicle 2) Part 3 Section 31.3 and ARIB STD-B10 Volume 2 Section 5.2.7.

Table 5 shows a structure of an event security descriptor. In the case of EIT+, the event security descriptor illustrated in FIG. 15 is newly defined and the event security descriptor is stored and transmitted in a descriptor field within the EIT. In the event security descriptor, a policy level (policy_level), an application ID (application_identifier), a control code (application_control_code), priority (application_priority), protocol identification (protocol_id), and a program-related flag (associated_application_flag) are set.

TABLE 5

| Data structure | Number of bits | Bit string |
| --- | --- | --- |
| event_security_descriptor( ){ | | |
|   descriptor_tag | 8 | uimsbf |
|   descriptor_length | 8 | uimsbf |
|   policy_level | 8 | uimsbf |
|   for (i=0; i<n; i++){ | | |
|     application_identifier( ) | | bslbf |
|     application_control_code | 8 | uimsbf |
|     application_priority | 8 | uimsbf |
|     protocol_id | 16 | uimsbf |
|     associated_application_flag | 1 | bslbf |
|     reserved_future_use | 7 | bslbf |
|   } | | |
| } | | | policy_level represents a policy level in units of programs. The policy level has a value of 1 to 4.

application_identifier( ) is an ID for identifying an application. Table 6 shows a structure of application_identifier( ).

TABLE 6

| Data structure | Number of bits | Bit string |
| --- | --- | --- |
| application_identifier( ){ | | |
|   organization_id | 32 | bslbf |
|   application_id | 16 | bslbf |
| } | | | organization_id represents an organization creating an application, and has a value after 0x00000063. application_id represents a number for identifying the application. application_id is uniquely assigned within organization identification.

application_control_code specifies a control code for controlling an application state. Table 7 shows the provision of the control code.

TABLE 7

| Code | ID name | Description |
| --- | --- | --- |
| 0x00 | reserved_future_use | |
| 0x01 | AUTOSTART | Automatic start of an application |
| 0x02 | PRESENT | Standby of an application |
| 0x03 | DESTROY | End of an application |
| 0x04 | KILL | Forced end of an application |
| 0x05 | reserved_future_use | |
| 0x06 | REMOTE | Indirect application |
| 0x07 | DISABLED | Non-use of an application |
| 0x08 | KILL ALL | Forced end of all applications |
| 0x09 ... 0xFF | reserved_future_use | | application_priority represents a policy level of each application. The policy level of each application represents relative priority among applications announced within a service. The priority has a value of 1 to 4.

protocol_id represents a protocol in which an application file is transmitted. Table 8 shows the provision of protocol_id.

TABLE 8

| Value | Description |
| --- | --- |
| 0x0000 | reserved_future_use |
| 0x0001 | Object carousel transmission protocol |
| 0x0002 | Reserved |
| 0x0003 | HTTP transmission protocol |
| 0x0004 | Data carousel transmission protocol |
| 0x0005 ... 0xFFFF | reserved_future_use | associated_application_flag represents whether an application cooperates with a program. Table 9 shows the provision of protocol_id.

TABLE 9

| Value | Description |
| --- | --- |
| 0 | No contents cooperating with a program is included |
| 1 | Contents cooperating with a program is included |

(3) AIT table definition and addition of a new descriptor to the AIT (AIT+): Policy information is transmitted by extending the AIT. The receiver implements control corresponding to a policy level for an occasionally generated event by analyzing this table and executing a desired process. The relationship with the ARIB standard is shown in ARIB STD-B23 Part 2 Section 10.16.

Table 10 shows a data structure of the AIT. The AIT shown in Table 10 is a table obtained by extending the data structure of the AIT specified in ARIB STD-B23. In the AIT, a policy level, an application ID, and a control code are described. The AIT is transmitted in the format of a section, and is constantly transmitted during event continuation. The application ID is described in application_identifier( ), and the control code is described in application_control_code.

Details on these are substantially the same as those described in the EIT extension.

Further, in order to describe the policy level, a security policy descriptor is newly defined and stored and transmitted in a common descriptor loop of the AIT.

TABLE 10

| Data structure | Number of bits | Bit string |
|---|---|---|
| application_information_section( ){ | | |
|   table_id | 8 | uimsbf |
|   section_syntax_indicator | 1 | bslbf |
|   reserved_future_use | 1 | bslbf |
|   reserved | 2 | bslbf |
|   section_length | 12 | uimsbf |
|   application_type | 16 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   reserved_future_use | 4 | bslbf |
|   common_descriptors_length | 12 | uimsbf |
|   for (i=-0, i<N; i++){ | | |
|     descriptor( ) | | |
|   } | | |
|   reserved_future_use | 4 | bslbf |
|   application_loop_length | 12 | uimsbf |
|   for (i=0; i<N; i++){ | | |
|     application_identifier( ) | | |
|     application_control_code | 8 | uimsbf |
|     reserved_future_use | 4 | bslbf |
|     application_descriptors_loop_length | 12 | uimsbf |
|     for (j=0; j<M; j++){ | | |
|       descriptor( ) | | |
|     } | | |
|   } | | |
|   CRC_32 | 32 | rpchof |
| } | | |

Table 11 shows a structure of a newly defined security policy descriptor.

TABLE 11

| Data structure | Number of bits | Bit string |
|---|---|---|
| security_policy_descriptor( ){ | | |
|   descriptor_tag | 8 | uimsbf |
|   descriptor_length | 8 | uimsbf |
|   policy_level | 3 | bslbf |
|   reserved_future_use | 5 | bslbf |
| } | | |

(4) EWS/EEW: A policy level is determined using emergency information transmitted from the broadcast station. In the receiver, the emergency information is pre-associated with a policy level. The generation and end of the emergency information are sensed by monitoring an EWS start flag of transmission and multiplexing configuration control (TMCC) in the case of the EWS, and a text superimposition management packet in the EEW. At this time, it is possible to determine the policy level. The relationship with the ARIB standard is shown in ARIB STD-B31 Section 3.15 and ARIB STD-B24 Volume 1 Part 3 Chapter 9.

The schemes of the above-described (1) to (4) can be simultaneously transmitted in parallel. Therefore, it is necessary to determine a scheme in which transmitted data has priority to determine a policy level. The priority is as follows.
    EWS/EEW>AIT+>EIT+>EIT The receiver determines the policy level based on the priority, and screen presentation control in which an event in an emergency has priority based on the broadcast provider's intention is possible.

[4.3.4 Example of Screen Presentation Control]

Figure 16:
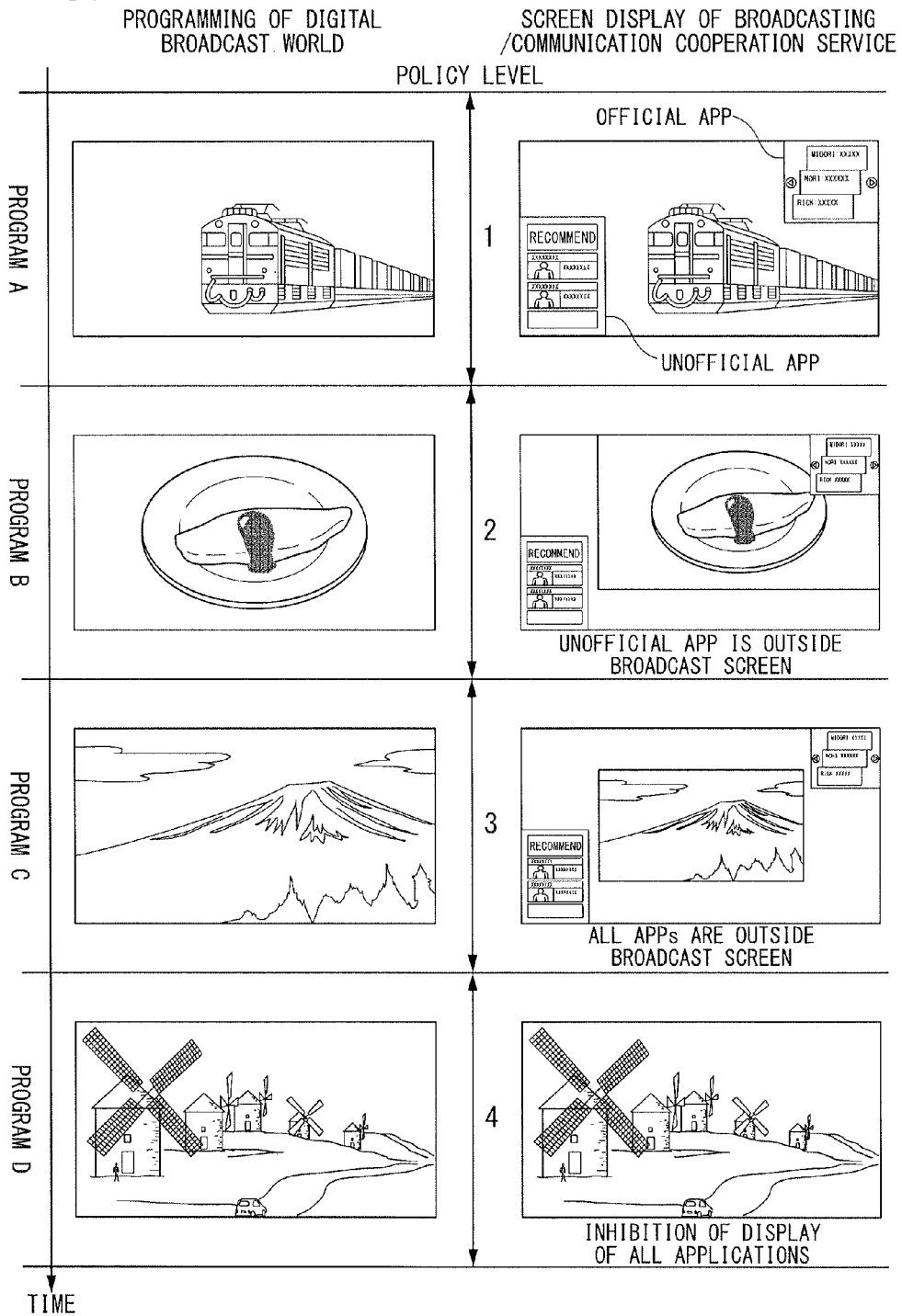
FIG. 16 is a diagram illustrating an example of the screen presentation control according to a policy level in the broadcast communication cooperation system.

FIG. 16 illustrates an example of screen presentation control corresponding to a policy level.

When the policy level of the program is "1," the superimposition of both an application screen of the official application and an application screen of the unofficial application on a broadcast screen is permitted.

When the policy level of the program is "2," the superimposition of only the official application on the broadcast screen is permitted, and the superimposition of the application screen of the unofficial application on the broadcast screen is denied and only a display of the application screen of the unofficial application outside the broadcast screen is permitted.

When the policy level of the program is "3," the application screen of the official application and the application screen of the unofficial application are also permitted to be displayed, but the superimposition of all application screens on the broadcast screen is prohibited and only a display of all the application screens outside the broadcast screen is permitted.

When the policy level is "4," only the overall screen display of the broadcast screen is permitted.

Figure 17:
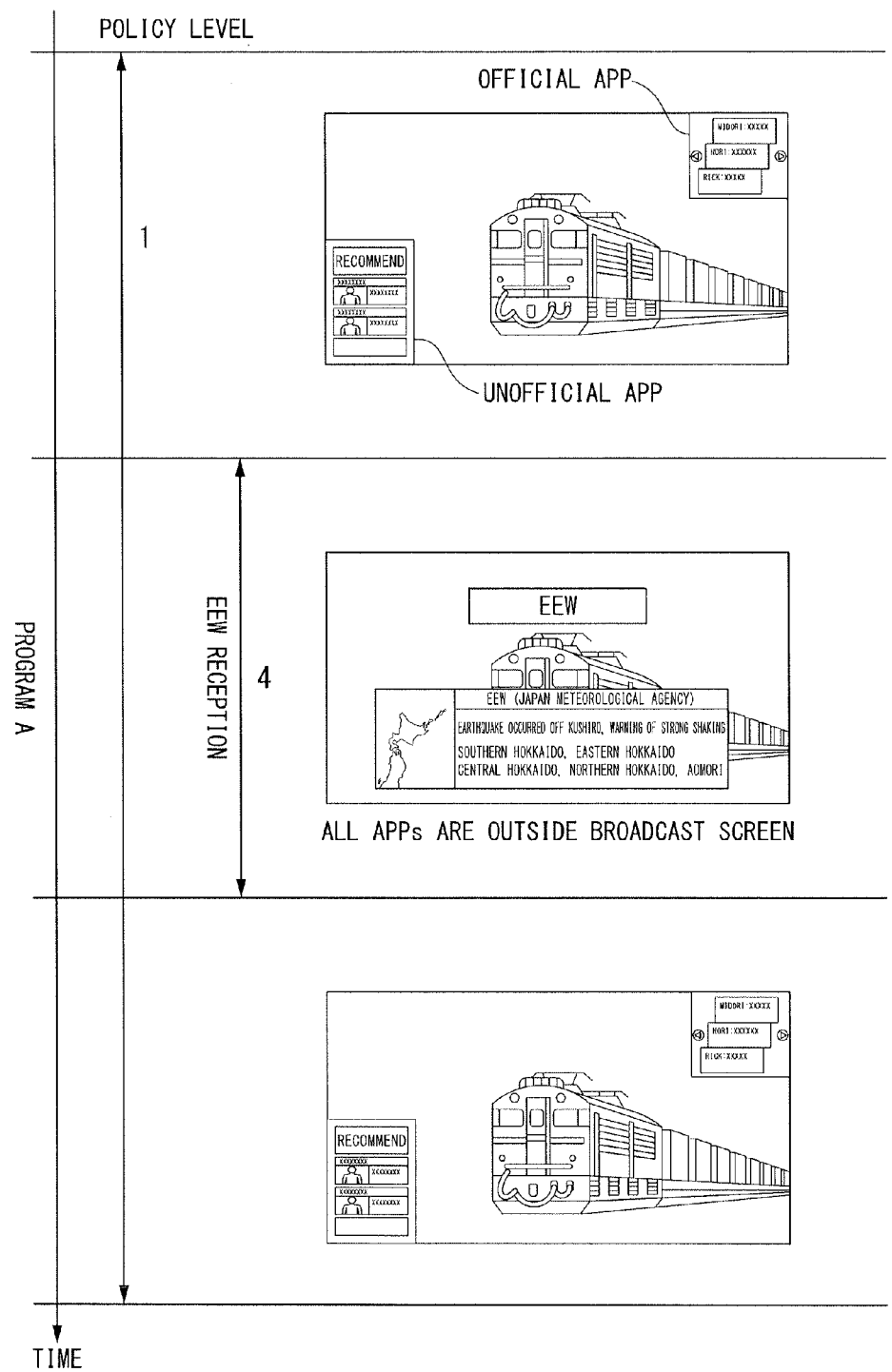
FIG. 17 is a diagram illustrating an example of presentation control at the time of reception of emergency earthquake breaking news in the broadcast communication cooperation system.

FIG. 17 illustrates an example of presentation control upon receiving an EEW. When a program policy level of a program A is "1," the application screen of the official application and the application screen of the unofficial application are also superimposed and displayed on the broadcast screen in a broadcast time band of the program A. However, the receiver determines that the policy level in the time band in which the EEW is generated among broadcast time bands of the program A is the policy level "4" of the EEW. Because of this, the receiver prohibits the superimposition of the application screen of the official application and the application screen of the unofficial application on the broadcast screen in a time band in which the EEW is generated even in the broadcast time band of the program A.

[Description of Embodiment of Present Invention to which Example of Above-Described Broadcasting/Communication Cooperation System has been Applied]

Next, the embodiment of the present invention illustrated in FIG. 1 will be described.

Figure 18:
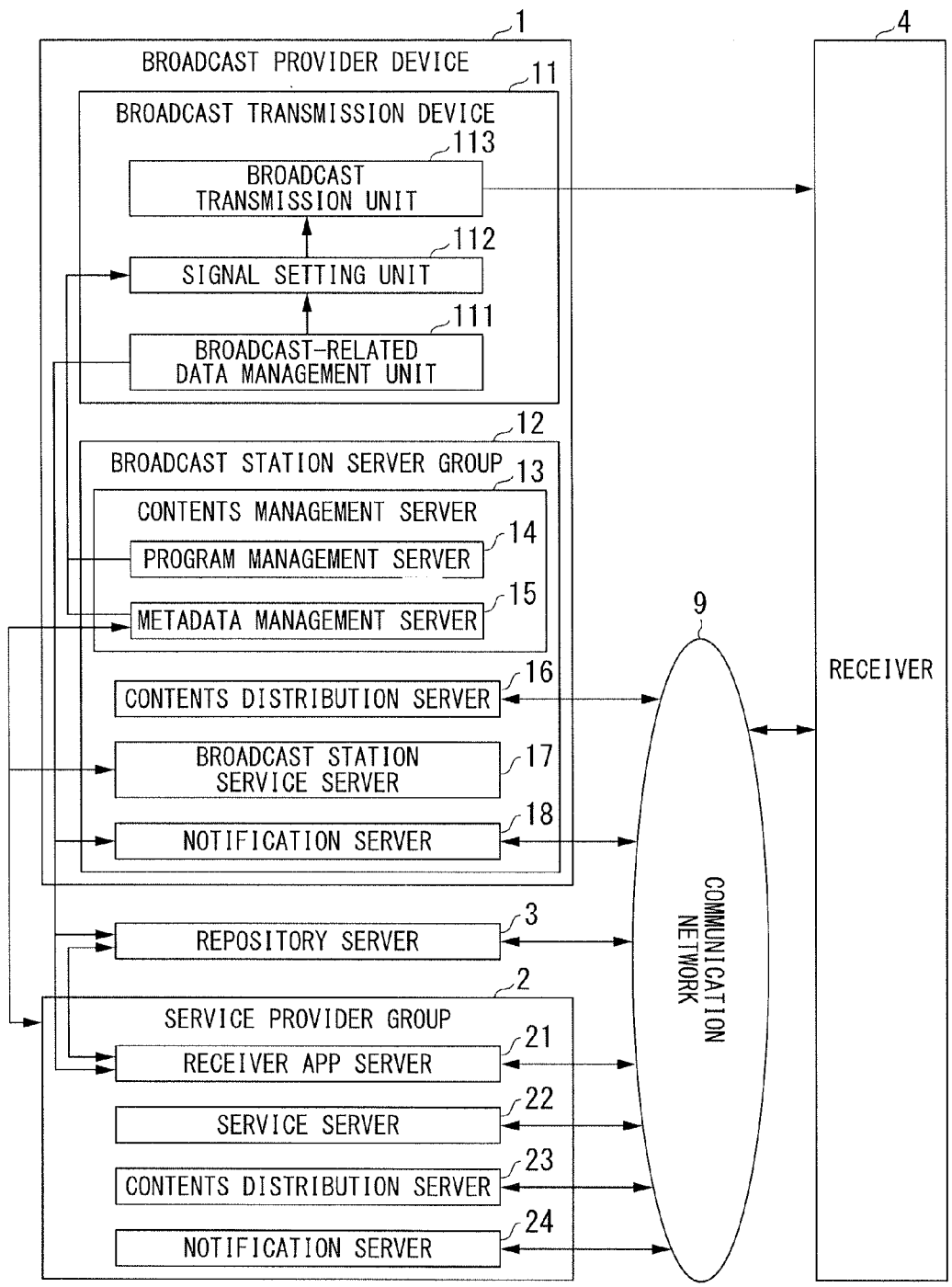
FIG. 18 is a diagram illustrating the overall constitution of a broadcast communication cooperation system according to an embodiment of the present invention.

FIG. 18 is an overall configuration diagram of the broadcasting/communication cooperation system according to the embodiment of the present invention. As illustrated in FIG. 18, the broadcasting/communication cooperation system of this embodiment is configured to include a broadcast provider device 1 owned by the broadcast station, a service provider server group 2 owned by the service provider, a repository server 3 owned by the system manager, and a receiver 4 owned by a viewer. Although one receiver 4 is illustrated in FIG. 18, a plurality of receivers 4 are actually provided.

The broadcast provider device 1 includes a broadcast transmission device 11 and a broadcast station server group 12.

The broadcast transmission device 11 corresponds to a broadcast station facility illustrated in FIG. 3, and is a broadcast facility for digital broadcasting including a programming facility, a program transmission facility, a transmission facility, etc.

The broadcast transmission device 11 is configured to include a broadcast-related data management unit 111, a signal setting unit 112, and a broadcast transmission unit 113.

The broadcast-related data management unit 111 manages program security policy data of each program, application security policy data of an official application, other policy data, etc.

The program security policy data includes policy level data representing a policy level of the program, an application ID of an application bound with the program, a control code for the application bound with the program, etc.

The application security policy data includes information specifying a program bound with an application, protocol identification of the application, location information, etc.

The location information represents a storage position (storage place) of the application, and, for example, is a uniform resource locator (URL) of a receiver app server 21 or a repository server 3 capable of downloading the application. The protocol identification indicates whether the application has been transmitted according to transmission or communication.

Only the official application is bound with the program.

The policy data includes presentation rule data and a policy level table.

The presentation rule data is data describing a presentation method of each policy level. The presentation method includes a screen display method and an audio output method. As the screen display method, for example, there are a method of displaying only a broadcast screen (program video), a method of superimposing application screens (application videos) of both an official application and an unofficial application on the broadcast screen or displaying the application screens outside the broadcast screen, a method of superimposing and displaying only the application screen of the official application on the broadcast screen and displaying the application screen of the unofficial application outside the broadcast screen, etc. As the audio output method, for example, there are a method of outputting only audio of a broadcast program, a method of independently outputting or mixing and outputting audio of the broadcast program and audio of the official application or the unofficial application, etc.

The policy level table is data describing a policy level corresponding to a genre of a program or a policy level of each event. The event, for example, is contents of a broadcast which is not necessarily generated in cooperation with the program such as an emergency warning signal or an EEW.

The signal setting unit 112 sets various data in a broadcast signal to be transmitted by the broadcast transmission unit 113.

The signal setting unit 112 sets the AIT and policy level data of a program in the broadcast signal based on program security policy data or application security policy data managed by the broadcast-related data management unit 111. The signal setting unit 112 sets whether to multiplex the AIT of the application bound with the program as an independent ES into a broadcast signal (broadcast TS) in a data carousel. Alternatively, the signal setting unit 112 sets information equivalent to the AIT of the application bound with the program in the EIT. In addition, the signal setting unit 112 sets policy level data of the program to the EIT (Table 5) or the AIT (Table 11). When the policy level corresponding to the genre of the program is used, the policy level data may not be set in a broadcast signal. In addition, the signal setting unit 112 sets the application file in a data carousel or the like. In addition, the signal setting unit 112 sets whether to set the policy data managed by the broadcast-related data management unit 111 in a broadcast signal in the form of a section in an engineering service or data carousel.

The broadcast transmission unit 113 transmits a broadcast signal of a digital broadcast. The broadcast signal includes information set by the signal setting unit 112.

The broadcast station server group 12 corresponds to the broadcast station server group illustrated in FIG. 3, and is configured to include a contents management server 13, a contents distribution server 16, a broadcast station service server 17, and a notification server 18.

The contents management server 13 is configured to include a program management server 14 and a metadata management server 15. The program management server 14 manages a previously broadcast program or a program to be broadcast. The metadata management server 15 manages metadata associated with each program. The metadata, for example, includes a program title, a program ID, a program outline, a performer, a broadcasting date, a script, subtitles, and explanatory data.

The contents distribution server 16 is connected to the receiver 4 via a communication network 9 such as the Internet, and distributes contents data of contents requested from the receiver 4.

The broadcast station service server 17 transmits contents data of a service of a broadcast station to the service provider server group 2. For example, there are a social network service; a blog service, etc. as the service of the broadcast station.

The notification server 18 is connected to the receiver 4 via the communication network 9, and distributes the AIT (FIG. 6) of the application bound with the program and policy level data of the program to the receiver 4 based on program security policy data and application security policy data acquired from the broadcast-related data management unit 111 of the broadcast transmission device 11. In addition, the notification server 18 distributes the policy data acquired from the broadcast-related data management unit 111 of the broadcast transmission device 11 to the receiver 4. Without distributing all or part of the information from the notification server 18, the broadcast transmission unit 113 of the broadcast transmission device 11 may transmit all or part of the information in only a broadcast signal.

The service provider server group 2 corresponds to the service provider server group illustrated in FIG. 3, and is configured to include a receiver app server 21, a service server 22, a contents distribution server 23, and a notification server 24. The receiver app server 21, the service server 22, the contents distribution server 23, and the notification server 24 are connected to the receiver 4 via the communication network 9.

The receiver app server 21 manages each application, and distributes an application file to the receiver 4.

The service server 22, for example, is a multilingual subtitle server, a speech speed conversion audio server, a social TV server, a recommendation server, a bookmark server, or the like, and distributes contents data of a service requested from the receiver 4.

The contents distribution server 23, for example, is a VOD distribution server, a subtitle distribution server, or a multiview distribution server, and distributes contents data of contents requested from the receiver 4.

The notification server 24 transmits the AIT (FIG. 6) of the application to the receiver 4. In the case of the official application, the notification server 24 may transmit the AIT (FIG. 6) based on the program security policy data or application security policy data acquired from the broadcast-related data management unit 111 of the broadcast transmission device 11.

The repository server 3 corresponds to the repository illustrated in FIG. 3, and is connected to the receiver 4 via the communication network 9. The repository server 3 makes an electronic signature in an application file (application program) generated by the service provider, and distributes data necessary for authentication of the electronic signature of the application file (application program) to the receiver 4. In addition, the repository server 3 transmits data representing a list of official applications or location information of the official applications to the receiver 4. The repository server 3 may transmit the application file of the official application having the electronic signature to the receiver 4, and the receiver app server 21 may receive the application file of the official application having the electronic signature from the repository server 3 and transmit the application file to the receiver 4. In addition, the repository server 3 may transmit the AIT of the official application to the receiver 4.

In addition, the repository server 3 may transmit the AIT (FIG. 6) of the official application bound with the program to the receiver 4 based on the program security policy data or the application security policy data received from the broadcast-related data management unit 111 of the broadcast transmission device 11.

The receiver 4 corresponds to the receiver illustrated in FIG. 3, and, for example, is a device such as a TV receiver, a set-top box, a personal computer, or a portable terminal.

Figure 19:
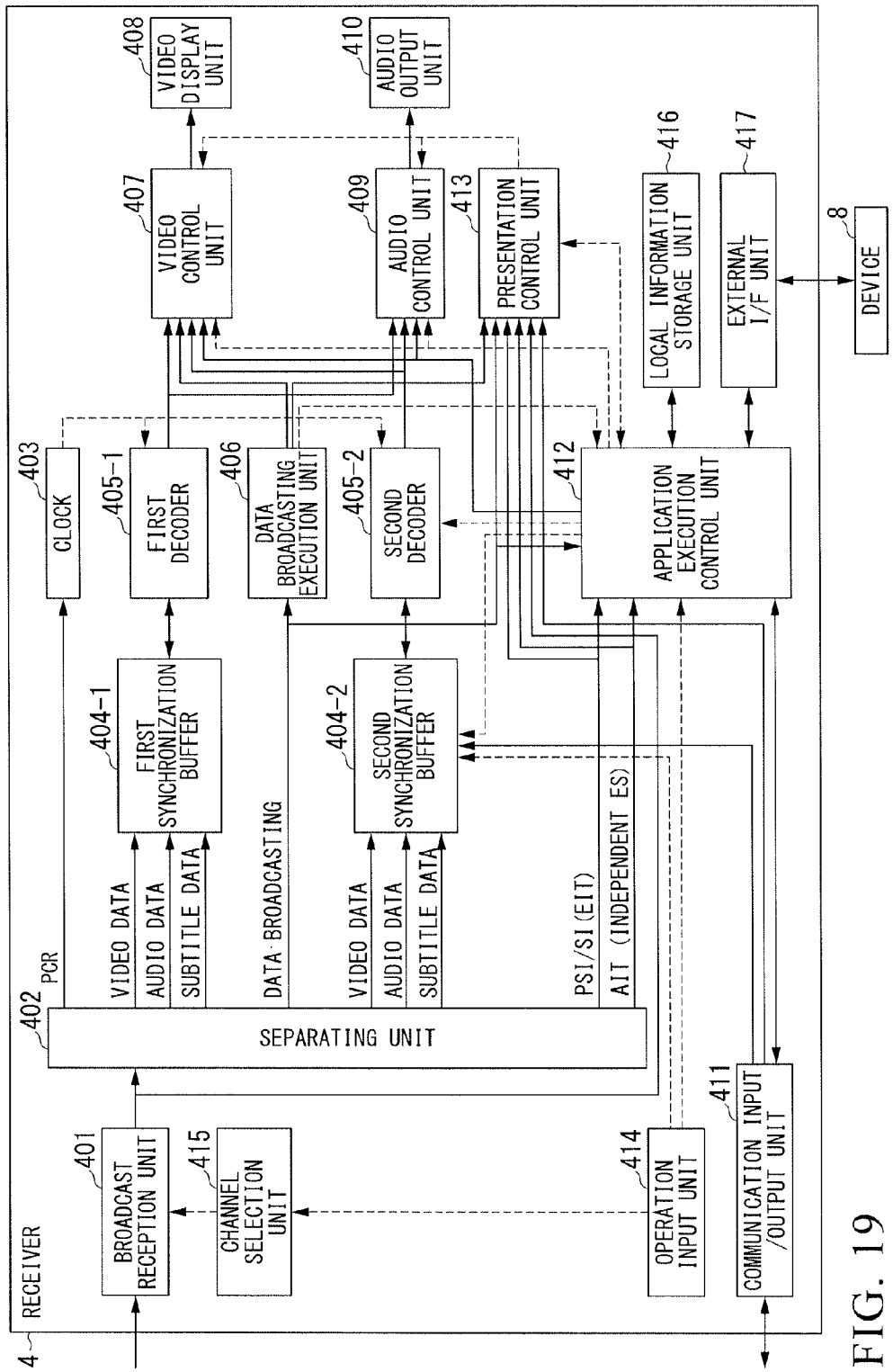
FIG. 19 is a functional block diagram illustrating the internal constitution of a receiver according to the embodiment.

FIG. 19 is a functional block diagram illustrating an internal configuration of the receiver 4. As illustrated in FIG. 19, the receiver 4 is configured to include a broadcast reception unit 401, a separating unit 402, a clock 403, a first synchronization buffer 404-1, a second synchronization buffer 404-2, a first decoder 405-1, a second decoder 405-2, a data broadcasting execution unit 406, a video control unit 407, a video display unit 408, an audio control unit 409, an audio output unit 410, a communication input/output unit 411, an application execution control unit 412, a presentation control unit 413, an operation input unit 414, a channel selection unit 415, a local information storage unit 416, and an external I/F unit 417.

The broadcast reception unit 401 is a tuner which receives a broadcast signal. The broadcast signal is a wireless broadcast signal and/or a wired broadcast signal. The wireless broadcast signal is a signal obtained by receiving broadcast radio waves (terrestrial waves) transmitted by a transmitting antenna of a broadcast station side or satellite waves relayed by a satellite via a receiving antenna. The wired broadcast signal is a signal transmitted from the broadcast station side via an optical cable, a coaxial cable, or the like. The broadcast reception unit 401 receives and demodulates the broadcast signal and outputs a broadcast stream (TS).

The separating unit 402 is a demultiplexer, and separates the broadcast stream supplied from the broadcast reception unit 401 into various data such as a PCR, video data, audio data, subtitle data, a data broadcast, program specific information (PSI)/SI, and an AIT transmitted in an independent ES. The AIT may be included in the data broadcast or the same contents as the AIT may be set in the EIT constituting the SI. In addition, the separating unit 402 may separate the application file from the broadcast signal to output the separated application file.

The communication input/output unit 411 inputs/outputs data according to communication via the communication network 9. The communication input/output unit 411 outputs the AIT or the application file transmitted via the communication network 9 to the application execution control unit 412. In addition, the communication input/output unit 411 outputs policy level data or policy data of a program transmitted via the communication network 9 to the presentation control unit 413. In addition, the communication input/output unit 411 receives contents data distributed from the contents distribution server 16 or the contents distribution server 23 and contents data distributed from the service server 22 via the communication network 9 according to an instruction of an application executed by the application execution control unit 412, and outputs the received data to the second synchronization buffer 404-2.

The operation input unit 414 is an I/F which receives an operation by a viewer, and, for example, is a receiving device, which receives information input by the user from a remote controller, a portable telephone, a tablet terminal, etc., a keyboard, a mouse, or the like. The operation input unit 414 outputs a media (terrestrial/BS) or channel selection instruction input by the viewer to the channel selection unit 415. In addition, the operation input unit 414 outputs an instruction of a start or end of the broadcasting/communication cooperation service and an instruction for an application to the application execution control unit 412.

The channel selection unit 415 controls media or channels received in the broadcast reception unit 401 according to an operation input to the operation input unit 414.

The data broadcasting execution unit 406 executes a data broadcasting application transmitted in a digital broadcast signal, and outputs video (graphic) data of a data broadcast to the video control unit 407. The data broadcasting execution unit 406 includes an API for starting an application of the broadcasting/communication cooperation service. When the data broadcasting execution unit 406 executes a data broadcasting application and an API for starting the application of the broadcasting/communication cooperation service is called, the data broadcasting execution unit 406 instructs the application execution control unit 412 to start the application. In addition, the data broadcasting execution unit 406 acquires an AIT or application file transmitted by a data carousel from a data broadcast and outputs the acquired AIT or application file to the application execution control unit 412. In addition, the data broadcasting execution unit 406 acquires policy data transmitted by a data carousel from a data broadcast and outputs the acquired policy data to the presentation control unit 413.

The application execution control unit 412 executes an application of the broadcasting/communication cooperation service. According to the executed application, the application execution control unit 412 instructs the second decoder 405-2 to decode contents data received from the contents distribution server 16, the contents distribution server 23, or the service server 22. The contents data includes either video data or audio data or both thereof. The video data, for example, is a moving image, a still image, text data, etc. In addition, according to the executed application, the application execution control unit 412 outputs a graphic (video) data or video control instruction to the video control unit 407, and outputs an audio data or audio control instruction to the audio control unit 409.

The clock 403 outputs a timer counter value. The clock 403 adjusts a frequency of an oscillator according to a timer counter value indicated by the PCR, and synchronizes a time with the broadcast transmission side.

The first synchronization buffer 404-1 stores video data, audio data, and subtitle data output from the separating unit 402. A packetized elementary stream (PES) generated from an ES of the video data, the audio data, and the subtitle data is divided into transport packets constituting the broadcast stream (TS) and set. In a header of the PES, a presentation time stamp (PTS) is included. The first synchronization buffer 404-1 outputs the video data, the audio data, and the subtitle data output from the separating unit 402 in units of PES packets according to an instruction of the first decoder 405-1.

The second synchronization buffer 404-2 stores contents or contents data of a service received by the communication input/output unit 411. Alternatively, the second synchronization buffer 404-2 stores the video data, the audio data, and the subtitle data output from the separating unit 402 according to an instruction of the viewer input by the operation input unit 414. The second synchronization buffer 404-2 outputs the stored contents data or the video data, the audio data, and the subtitle data of the program in units of PES packets according to an instruction of the second decoder 405-2.

The first decoder 405-1 specifies a PES packet within the first synchronization buffer 404-1 in which the PTS corresponding to a time output from the clock 403 is set, reads video data, audio data, and subtitle data encoded from the specified PES packet, and decodes the read data to output the decoded data.

The second decoder 405-2 specifies a PES packet of contents data or a program within the second synchronization buffer 404-2 in which the PTS corresponding to a time output from the clock 403 is set, reads video data, audio data, and subtitle data encoded from the specified PES packet, and decodes the read data to output the decoded data.

The presentation control unit 413 determines a presentation method (a screen display method and an audio output method) according to a policy level of a program of a selected channel or a policy level of an event being generated and presentation rule data. The presentation control unit 413 instructs the video control unit 407 to display a broadcast screen, an application screen of an official application, and an application screen of an unofficial application according to the determined screen display method. Further, the presentation control unit 413 instructs the audio control unit 409 to output audio based on audio data of a broadcast, audio based on audio data of the official application, and audio based on audio data of the unofficial application according to the determined audio output method.

The video control unit 407 causes the video display unit 408 to display a broadcast screen based on video data and subtitle data of a program output from the first decoder 405-1 and application screens of the official application and the unofficial application based on video data of contents data output from the second decoder 405-2 according to a screen display method indicated from the presentation control unit 413 or the application execution control unit 412. In addition, when graphic (video) data has been output according to execution of an application from the application execution control unit 412, the video control unit 407 also causes the video display unit 408 to display a display screen based on the video data according to the screen display method indicated from the presentation control unit 413 or the application execution control unit 412. Also, video data and subtitle data of another program may be output from the second decoder 405-2.

The video display unit 408 is a general display, and displays broadcast and application screens. For example, the video display unit 408 displays a video obtained by combining a broadcast screen of a program with a moving image, a still image, or text of contents data received from the communication network 9, an application screen such as a graphic output from the application execution control unit 412 according to execution of the application, or a broadcast screen of another program.

The audio control unit 409 causes audio based on audio data of a program output from the first decoder 405-1, audio of the official application or the unofficial application based on audio data of contents data output from the second decoder 405-2, and audio based on audio data output from the application execution control unit 412 by executing the application to be output from the audio output unit 410 according to the audio output method indicated from the presentation control unit 413 or the application execution control unit 412. The audio data of the other program may be output from the second decoder 405-2. The audio output unit 410 is a general speaker, and outputs audio of a broadcast and an application.

The local information storage unit 416 stores various data such as user information.

An external interface unit (hereinafter referred to as an "external I/F unit") 417 transmits and receives data to and from a device 8 connected to a home network such as a local area network (LAN). The device 8 is a terminal that operates in cooperation with the receiver 4, and, for example, is a personal computer, a portable telephone, a tablet, a smartphone, or a personal digital assistant (PDA).

Also, when the receiver 4 is a set-top box or the like, the video display unit 408 and the audio output unit 410 serve as an external device connected to the receiver 4.

Figure 20:
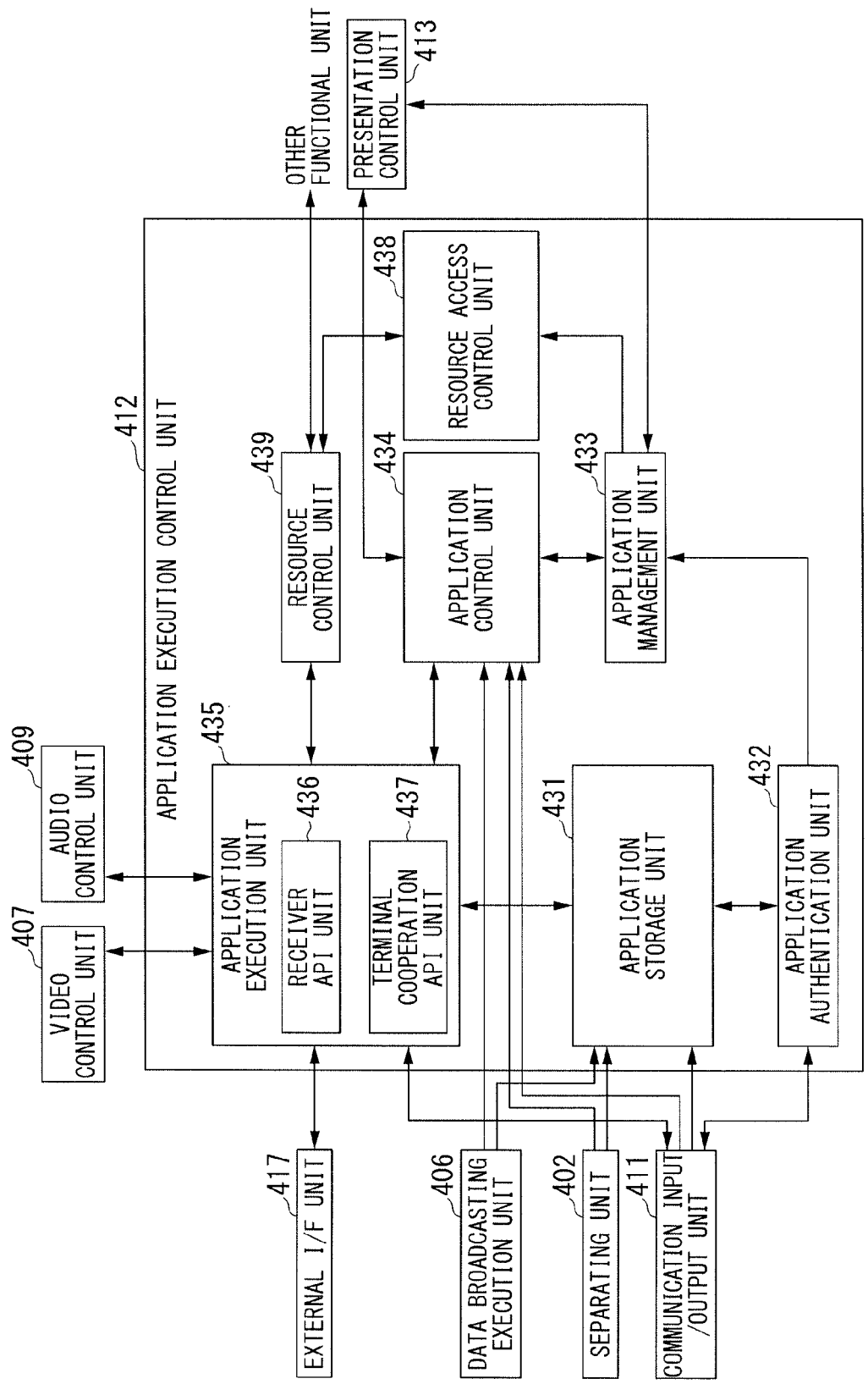
FIG. 20 is a block diagram illustrating the detailed constitution of an application execution control unit according to the embodiment.

FIG. 20 is a block diagram illustrating a detailed configuration of the application execution control unit 412.

As illustrated in FIG. 20, the application execution control unit 412 includes an application storage unit 431, an application authentication unit 432, an application management unit 433, an application control unit 434, an application execution unit 435, a resource access control unit 438, and a resource control unit 439.

The application storage unit 431 stores an application file received by the communication input/output unit 411 via the communication network 9, an application file acquired by the data broadcasting execution unit 406 from a data broadcast, or an application file separated by the separating unit 402 from a broadcast signal. The application file may be pre-stored in the application storage unit 431 at a factory or the like. The application storage unit 431 includes a main storage device and an auxiliary storage device such as a disc, and, for example, the application file is stored on the disc and is read to the main storage device during execution. In this case, an application file of an application executed on the fly is stored only in the main storage device without being stored in the disc, and is deleted from the main storage device when the execution ends.

The application authentication unit 432 receives data necessary for authentication of an electronic signature from the repository server 3, and authenticates the electronic signature added to an application file (application program) using the received data. For example, the application authentication unit 432 decodes the application file having the electronic signature using a public key received from the repository server 3. When a predetermined data stream has been acquired as a result, the application authentication unit 432 determines that the authentication of the electronic signature has succeeded. The application authentication unit 432 determines that it is an official application when the authentication of the electronic signature has succeeded, and determines that it is an unofficial application when the authentication of the electronic signature has failed or when no electronic signature has been added.

The application management unit 433 manages a state of a start or stop of the application according to the application execution unit 435 and an output situation of a started application. The output situation is information about whether an image or audio has been output from an application in operation. The application management unit 433 receives a query from the presentation control unit 413, and returns an output situation of the started application and a response of whether the started application is an official application or an unofficial application.

The application control unit 434 controls the start or stop of the application in the application execution unit 435 and the like according to a control code for the application bound with the program or an instruction for the application input by the operation input unit 414. In addition, the application control unit 434 instructs the application execution unit 435 to start the application of which the start is indicated from the data broadcasting execution unit 406. When a channel is changed according to an input from the operation input unit 414, the application control unit 434 instructs the application execution unit 435 to end the application bound with a program of a channel before the change and start the application bound with a program of a channel after the change. Also, the application control unit 434 acquires the application bound with the program or the control code for the bound application from an AIT included in an independent ES of a broadcast signal or a data broadcast, information equivalent to an AIT acquired from an EIT of the broadcast signal, or an AIT received from the notification server 18 or 24 via the communication input/output unit 411. In addition, the application control unit 434 transmits a download request of an application file using location information set in the AIT as a destination. The repository server 3 or the receiver app server 21 receiving the download request from the receiver 4 distributes the application file to the receiver 4.

The application execution unit 435 includes a receiver API unit 436 and a terminal cooperation API unit 437. According to the instruction from the application control unit 434, the application execution unit 435 reads an application program of an application of a start instruction from the application storage unit 431 and executes the read application program. The application execution unit 435 executes the application program, so that the application operates on the receiver 4 and the application execution unit 435 requests the contents distribution server 16 or 23 to distribute contents via the communication network 9 or requests the service server 22 to provide a service. In addition, by executing the application program, the application execution unit 435 outputs a graphic data or video control instruction to the video control unit 407 or outputs an audio data or audio control instruction to the audio control unit 409.

The receiver API unit 436 executes a receiver API which is an API for using each resource within the receiver 4 when the application execution unit 435 executes the application. The receiver API unit 436 executes the receiver API, so that a resource within the receiver 4 from an application program executed by the application execution unit 435 is available.

The terminal cooperation API unit 437 executes a terminal cooperation API which is an API for enabling the device 8 on the home network communicable using the external I/F unit 417 or a device connected via the communication network 9 to use the function of the receiver 4. The terminal cooperation API unit 437 executes the terminal cooperation API, so that the resource within the receiver 4 from the device 8 connected via the home network or the device connected via the communication network 9 is available.

The resource control unit 439 controls access from the receiver API unit 436 or the terminal cooperation API unit 437 to each functional unit which is a resource within the receiver 4.

The resource access control unit 438 controls whether to permit the access from the receiver API unit 436 or the terminal cooperation API unit 437 to each functional unit within the receiver 4. The resource access control unit 438 performs this control according to whether an application that is a caller of each API executed by the receiver API unit 436 or the terminal cooperation API unit 437 is an official application or an unofficial application.

Figure 21:
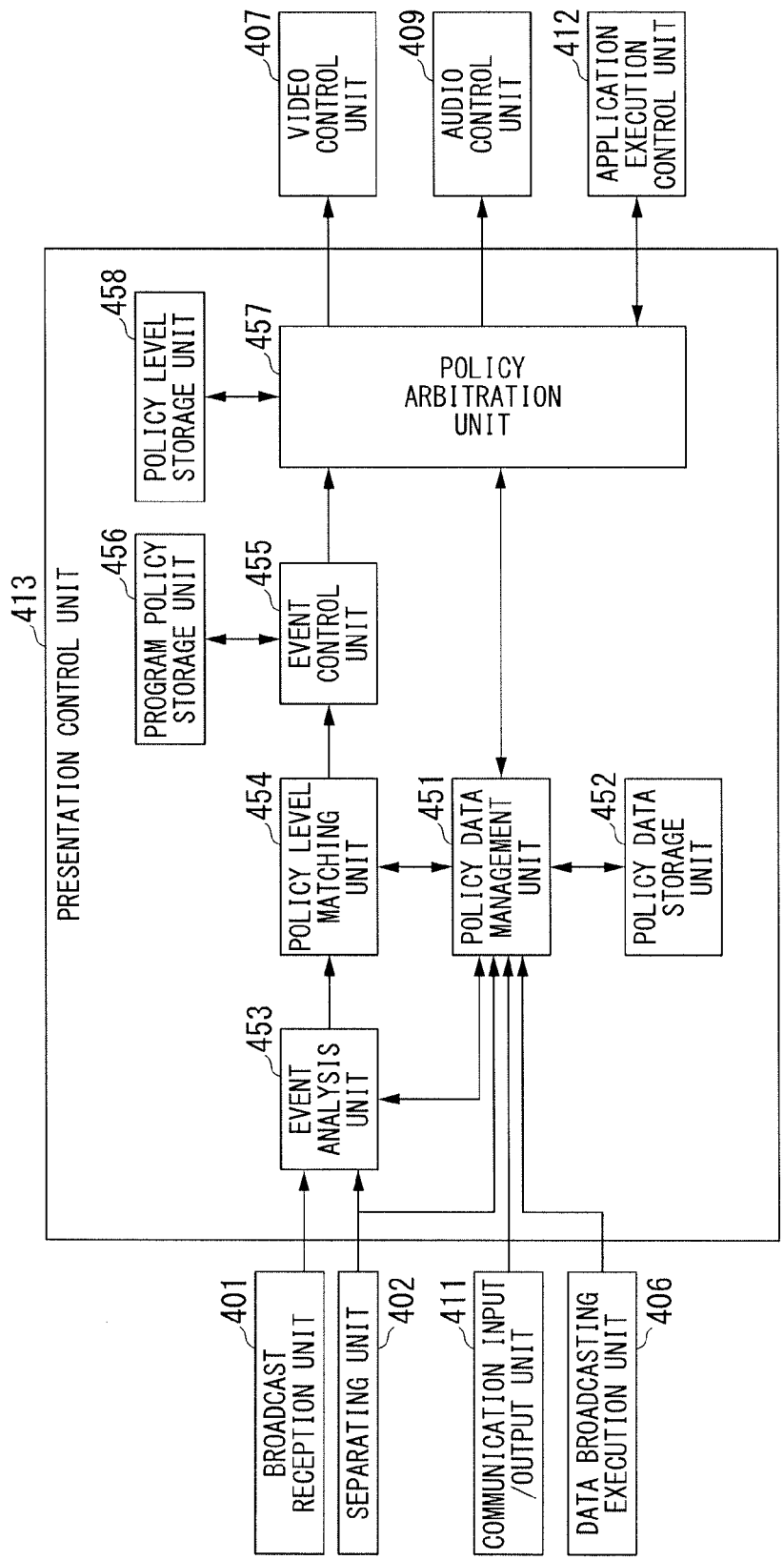
FIG. 21 is a block diagram illustrating the detailed constitution of a representation control unit according to the embodiment.

FIG. 21 is a block diagram illustrating a detailed configuration of the presentation control unit 413. As illustrated in FIG. 21, the presentation control unit 413 includes a policy data management unit 451, a policy data storage unit 452, an event analysis unit 453, a policy level matching unit 454, an event control unit 455, a program policy storage unit 456, a policy arbitration unit 457, and a policy level storage unit 458.

The policy data storage unit 452 stores policy data including presentation rule data and a policy level table. The policy data management unit 451 manages the policy data stored in the policy data storage unit 452. The policy data management unit 451 outputs the policy level table read from the policy data storage unit 452 to the policy level matching unit 454, and outputs presentation rule data read from the policy data storage unit 452 to the policy arbitration unit 457. In addition, the policy data management unit 451 receives policy data transmitted by broadcasting from the separating unit 402 or the data broadcasting execution unit 406, and receives policy data transmitted by communication from the communication input/output unit 411. The policy data management unit 451 updates policy data stored in the policy data storage unit 452 according to the policy data transmitted by the broadcasting or communication.

The event analysis unit 453 analyzes a broadcast signal received by the broadcast reception unit 401 or a data broadcast or subtitle data separated by the separating unit 402 and detects generation or an end of an event. When the generation or end of the event is detected (analyzed), the event analysis unit 453 outputs an event number of the detected event and status data representing the generation or end to the policy level matching unit 454.

The policy level matching unit 454 determines (matches) a policy level corresponding to a genre of each program indicated by the EIT and a policy level corresponding to an event specified by an event number by referring to a policy level table. The policy level matching unit 454 outputs data of a broadcast start time and a broadcast end time of a program acquired from the SI input from the separating unit 402 and a policy level (hereinafter referred to as a "program policy level") of the program to the event control unit 455. When the program policy level is set in the EIT, the policy level matching unit 454 outputs the data of the broadcast start time and the broadcast end time of the program and the program policy level of the program acquired from the EIT to the event control unit 455.

In addition, when the program policy level has been acquired from the AIT, the policy level matching unit 454 outputs the acquired program policy level to the policy arbitration unit 457. In addition, the policy level matching unit 454 outputs a policy level (hereinafter referred to as "trigger policy level") determined in correspondence with the event number to the policy arbitration unit 457.

The program policy storage unit 456 associates and stores the program policy level with the program start time and the program end time. The event control unit 455 associates the data of the program start time and the program end time input from the policy level matching unit 454 with the program policy level, writes the association result to the program policy storage unit 456, and manages a time at which display control is executed based on information stored in the program policy storage unit 456. The event control unit 455 refers to the data of the program start time stored in the program policy storage unit 456, and outputs the execution time and a program policy level corresponding to the execution time to the policy arbitration unit 457 when detecting the execution time and a time at which a notification of the execution time should be provided.

The policy level storage unit 458 stores the execution time and the program policy level input to the policy arbitration unit 457, the trigger policy level, and the status data. The policy arbitration unit 457 determines a policy level from the execution time and the program policy level input from the event control unit 455 and the trigger policy level input from the policy level matching unit 454. For example, the trigger policy level may be determined to be the policy level, and a higher level between the program policy level and the trigger policy level may be determined to be the policy level.

Also, when the program policy level acquired according to the AIT from the policy level matching unit 454 has been input, the policy arbitration unit 457 prioritizes the program policy level input from the policy level matching unit 454 above the program policy level input from the event control unit 455. That is, the policy arbitration unit 457 determines the policy level from the program policy level obtained from the AIT and the trigger policy level. The policy arbitration unit 457 refers to presentation rule data, and determines a screen display method and an audio output method (presentation method) from the determined policy level and information about whether an application in operation acquired from the application management unit 433 is official or an output situation. The policy arbitration unit 457 outputs the determined screen display method to the video control unit 407, and outputs the determined audio output method to the audio control unit 409.

Next, the search metadata transmitted to the terminal device 471 by the receiver 4 will be described with reference to FIGS. 22 and 23. Here, a case in which the search metadata is a search keyword will be described.

Figure 22:
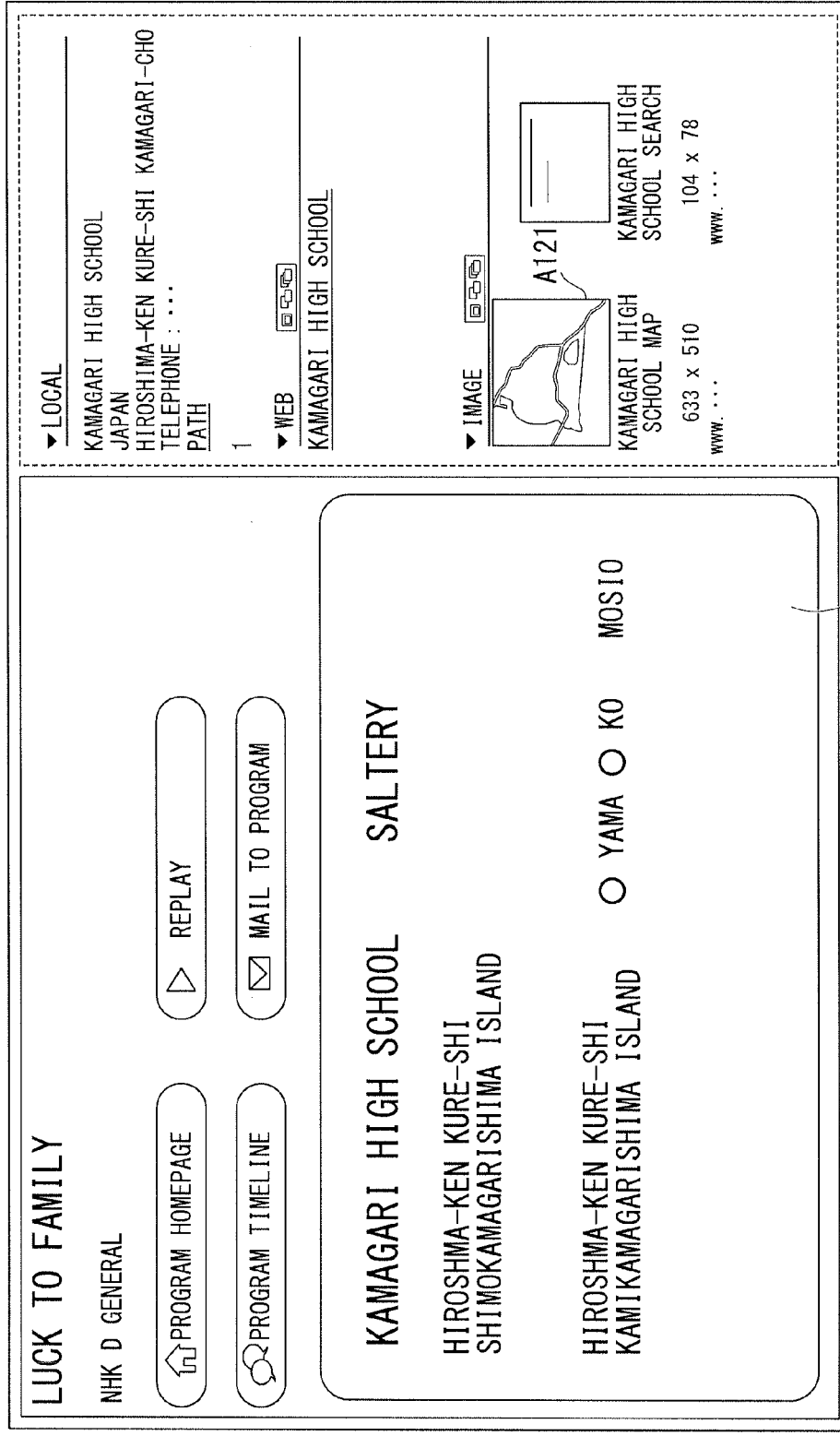
FIG. 22 is a diagram illustrating a screen display example of a terminal device according to the embodiment.

FIG. 22 is a diagram illustrating a screen display example of the terminal device 471. FIG. 22 illustrates an example of a screen display of the terminal device 471 at the time of broadcast of a program in which program performers visit the neighborhood of Kamagari and introduce the appearance of this region. A display screen of the terminal device 471 includes a search keyword display area A11 in which search keywords are displayed and an associated information display area A12 in which information associated with each search keyword is displayed. In particular, the associated information display area A12 includes a map display area A121.

Here, when the screen of the terminal device 471 includes a touch panel and either of the keywords is touched, the terminal device 471 acquires various kinds of information such as an address (for example, a URL) of a webpage associated with the touched keyword using a search engine and displays the acquired information in the associated information display area A12.

FIG. 23 is a data structure diagram illustrating an example of the structure of transmission data which the receiver 4 transmits to the terminal device 471 and includes the search keyword. In FIG. 23, information displayed in the search keyword display area A11 in FIG. 22 is expressed in an XML format.

The terminal device 471 stores display rules based on types of tags included in the transmission data in advance, and thus displays items according to the size of the screen which the terminal device 471 itself has according to the display rules. FIG. 22 illustrates an example of a relatively small display screen of the terminal device 471. The terminal device 471 reads and displays the search keyword among the transmission data illustrated in FIG. 23. Here, the search keywords are character strings interposed between tags "<Value>" in lines L21 to L26 of FIG. 23. In the terminal device 471 having a larger display screen, for example, incidental information of the search keywords interposed between tags "<Description>" shown in lines L31 and L32 is displayed in addition to the search keywords interposed between the tags "<Value>."

A character string of a portion indicated by reference numeral A21 represents a position shown by the search keyword as a latitude and a longitude. Hereinafter, the latitude and the longitude are referred to as "positional information."

Thus, when the receiver 4 includes the positional information in the transmission data and transmits the position information, the terminal device 471 can display a map of a corresponding region. For example, in the example of FIG. 22, the terminal device 471 displays the map of Kamagari high school included in the search keywords in the map display area A121.

Further, when the receiver 4 includes the positional information in the transmission data and transmits the positional information, a place shown in the search keyword can be uniquely specified. For example, using only a search keyword "Nihonbashi," Nihonbashi of Tokyo and Nihonbashi of Osaka may not be distinguished from each other. On the other hand, by including the positional information in the transmission data, each Nihonbashi can be uniquely specified.

Next, a process of a terminal cooperation system 500 will be described with reference to FIGS. 24 and 25.

Figure 24:
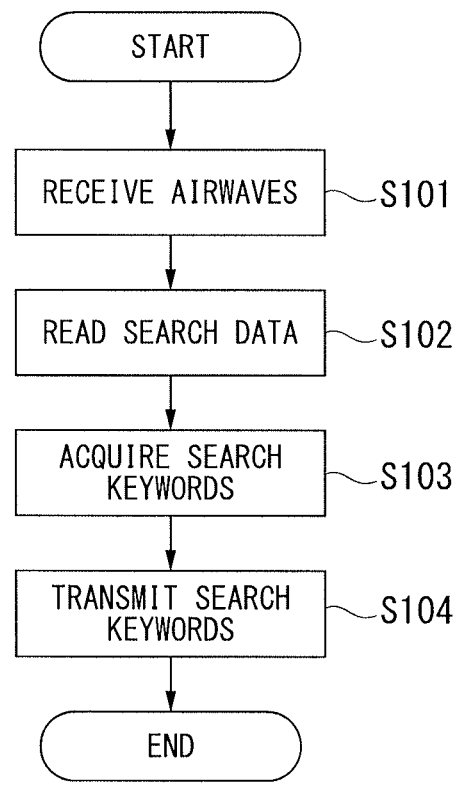
FIG. 24 is a flowchart illustrating a processing order in which the receiver according to the embodiment receives airwaves and transmits the search keywords.

FIG. 24 is a flowchart illustrating a processing order in which the receiver 4 receives airwaves and transmits the search keywords.

Here, first, the meta management server 15 outputs metadata associated with broadcast contents (program) to the signal setting unit 112 of the broadcast transmission device 11. For example, the meta management server 15 generates metadata including search keywords in addition to the title, the program ID, the program brief overview, and the like of a program and outputs the metadata to the signal setting unit 112 of the broadcast transmission device 11. The signal setting unit 112 stores the metadata output from the meta management server 15 in a broadcast signal. The broadcast transmission unit 113 transmits the broadcast signal.

The broadcast reception unit 401 receives the broadcast signal and outputs the broadcast signal to the separating unit 402 (step S101). Next, the separating unit 402 separates search metadata from a broadcast stream output from the broadcast reception unit 401 and outputs the search metadata to the application execution control unit 412 (step S102). Then, the application execution control unit 412 acquires the search keywords based on the search metadata separated by the separating unit 402 (step S103) and transmits the search keywords to the terminal device 471 via the external IN unit 417 (step S104).

The receiver 4 repeatedly performs the processes illustrated in FIG. 24 while receiving the airwaves.

Here, the XML file described with reference to FIG. 23 is included in an extended EIT (hereinafter simply referred to as an "EIT") of the airwaves and is transmitted as the search metadata. Thus, in step S102 described above, the separating unit 402 separates the EIT from the broadcast stream output from the broadcast reception unit 401 and outputs the EIT to the application execution control unit 412. Then, in step S103 described above, the application execution control unit 412 reads the search metadata from the EIT output from the separating unit 402 and outputs the search metadata to the external I/F unit 417. Then, in step S104 described above, the external I/F unit 417 transmits the search metadata output from the application execution control unit 412 to the terminal device 471.

A method of allowing the application execution control unit 412 to acquire the search keywords is not limited to the foregoing method. For example, the search metadata may be included in an AIT instead of the EIT and may be transmitted, and then the separating unit 402 may read the search metadata from the AIT in step S102 described above. The EIT or the AIT may be transmitted with a DMSS-CC data carousel.

Alternatively, an XML file including the search keywords may be stored in a server device on a network and a network address used to access the XML file may be included in an EIT or an AIT of the airwaves and may be transmitted as the search metadata. In this case, in step S102 described above, the application execution control unit 412 reads the network address from the EIT or the AIT output from the separating unit 402 and outputs the network address to the application execution control unit 412. Then, in step S103 described above, the application execution control unit 412 may acquire the XML file from the server device via the communication input/output unit 411 according to the acquired network address. The network address used to access the XML file is expressed in, for example, a URL format.

Thus, the application execution control unit 412 acquires the network address included and transmitted in the airwaves, accesses a storage region in which the search keywords are stored according to the network address, and acquires the search keywords. Accordingly, even when the number of search keywords is large, the application execution control unit 412 can acquire the search keywords as long as one network address is included in the airwaves. Therefore, when the number of search keywords is large, it is possible to suppress an increase in an amount of data included in the airwaves. Further, since the search keywords are stored in the server device, a provider of the search keywords can easily access the server device and update the search keywords.

In the above-described embodiment, the case in which the receiver 4 acquires the network address and acquires the search keywords according to the acquired network address has been described. However, the receiver 4 may acquire a network address and transmit the network address to the terminal device 471 and the terminal device 471 may access the storage region in which the search keywords are stored according to the network address and acquire the search keywords. For example, instead of the above-described application execution control unit 412, the control unit 473 of the terminal device 471 may access the storage region in which the search keywords are stored according to the network address and acquire the search keywords. In this case, the application execution control unit 412 reads the network address from the EIT or the AIT output from the separating unit 402 and transmits the read network address to the control unit 473 via the external I/F units 417 and 472. Then, when the control unit 473 acquires the network address from the receiver 4, the control unit 473 causes the display unit 475 to display the network address. The operation unit 474 may receive an input operation indicating whether the acquisition of the search keywords is permitted. In this case, when the operation unit 474 receives the input operation indicating that the acquisition of the search keywords is permitted, the control unit 473 accesses the storage region in which the search keywords are stored according to the network address and acquires the search keywords. Conversely, when the operation unit 474 receives the input operation indicating that the acquisition of the search keywords is not permitted, the control unit 473 does not acquire the search keywords.

As described above, the example in which the control unit 473 accesses the storage region in which the search keywords are stored and acquires the search keywords when the operation unit 474 receives the input operation indicating that the acquisition of the search keywords is permitted has been described. On the other hand, even when the operation unit 474 does not receive the input operation indicating that the acquisition of the search keywords is permitted, the control unit 473 may access the storage region in which the search keywords are stored and acquire the search keywords. For example, when the network address from the receiver 4 is acquired, the control unit 473 accesses the storage region in which the search keywords are stored according to the network address and acquires the search keywords.

As described above, even when the terminal device 471 acquires the search keywords, it is possible to suppress an increase in the amount of data included in the airwaves in spite of the fact that the number of search keywords is large, as in the case in which the receiver 4 acquires the search keywords. Further, the provider of the search keywords can easily access the server device and update the search keywords.

When the operation unit 474 receives the input operation indicating that the acquisition of the search keywords is permitted, the control unit 473 is configured to acquire the search keywords. Therefore, it is possible to suppress the acquisition of the search keywords according to the input operation received by the operation unit 474 and reduce an amount of communication by which the storage region in which the search keywords are stored is accessed.

The receiver 4 may transmit a sequence of the search keywords rather than the XML file to the terminal device 471.

Figure 25:
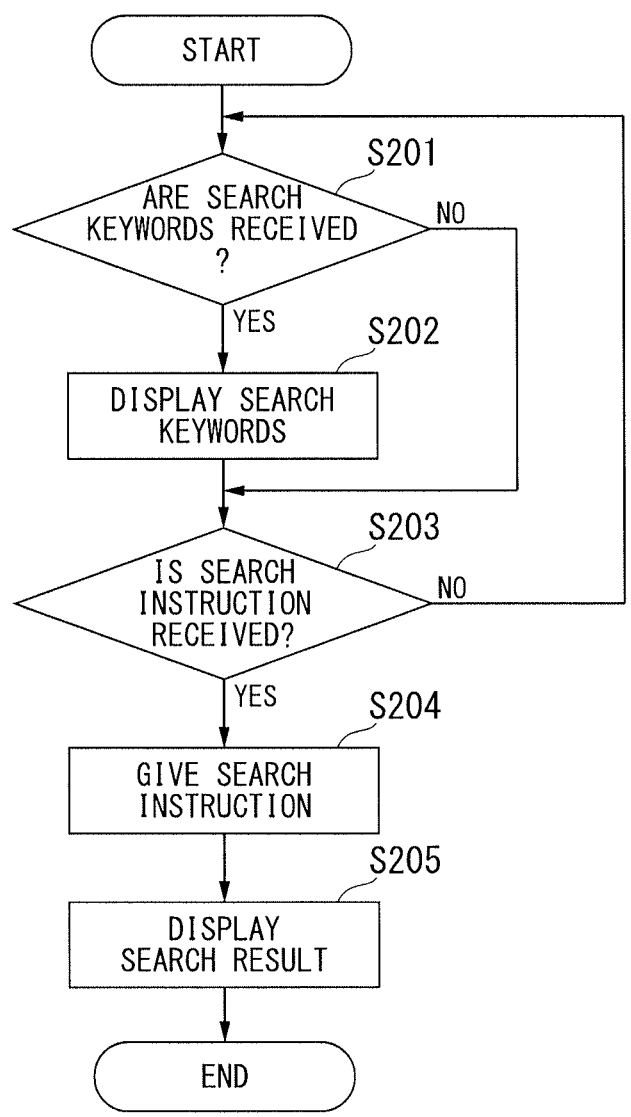
FIG. 25 is a flowchart illustrating a processing order in which the terminal device according to the embodiment receives the search keywords and displays a search result of the search keyword selected by a user.

FIG. 25 is a flowchart illustrating a processing order in which the search keywords are received by the terminal device 471 and the search result of the search keyword selected by the user is displayed.

First, the control unit 473 determines whether the external I/F unit 472 receives the search keywords (step S201). When the control unit 473 determines that the external I/F unit 472 receives the search keywords (YES in step S201), the control unit 473 causes the display unit 475 to display the search keywords (step S202).

Next, the control unit 473 determines whether the operation unit 474 receives a search instruction by selection of the search keyword (step S203). When the control unit 473 determines that the search instruction is received (YES in step S203), the process returns to step S201.

Conversely, when the control unit 473 determines that the search instruction is not received (NO in step S203), the control unit 473 transmits a search instruction to the search engine via the external I/F unit 472 (step S204). Here, the control unit 473 includes the search keyword designated by the search instruction which the operation unit 474 receives and transmits the search instruction to the search engine. For example, the control unit 473 transmits the search instruction to the receiver 4 via the external I/F unit 472. Then, the receiver 4 transmits the search instruction to the search engine included in the server device connected to the communication network 9.

When the external I/F unit 472 receives the search result, the control unit 473 causes the display unit 475 to display the search result (step S205).

The terminal device 471 repeatedly performs the processes illustrated in FIG. 25 while the terminal device 471 operates.

Conversely, when it is determined in step S201 that the external I/F unit 472 does not receive the search keywords (NO in step S201), the process proceeds to step S203.

As described above, the broadcast reception unit 401 receives the airwaves in which the search metadata, which is information for acquiring the search keywords, is included and is transmitted and the application execution control unit 412 acquires the search metadata from the airwaves received by the broadcast reception unit 401. Then, the application execution control unit 412 acquires the search keywords based on the search metadata and the external I/F unit 417 transmits the search keywords acquired by the application execution control unit 412 to the terminal device 471. Accordingly, the terminal device 471 can perform the keyword searching using the keyword selected by displaying the keywords and receiving the selection operation of the user. Thus, the viewer of the broadcast program can acquire information displayed by the terminal device 471 and associated with the program more simply by selecting the information associated with the program.

That is, the search keywords or the like used to search for the information associated with the broadcast program are included and transmitted as the metadata in the airwaves. Then, the receiver 4 acquires the search keywords and transmits the search keywords to the terminal device 471, and then the terminal device 471 displays the received search keywords. Accordingly, the viewer of the broadcast program can perform the searching by simply selecting the search keywords displayed on the terminal device 471, and thus it is not necessary to input the keywords. For example, even a viewer with a handicapped hand or a viewer not accustomed to mechanical operations can easily search for information associated with a program.

Accordingly, viewers may better comprehend the program, and thus an increase in an interest of the viewers in the program or an increase in the number of viewers can be expected.

The application execution control unit 412 and the presentation control unit 413 of the above-described receiver 4 include a computer system therein. Procedures of the processes of the application execution control unit 412 and the presentation control unit 413 of the receiver 4 are stored in a program format in a computer-readable recording medium and the foregoing processes are performed by causing the computer system to read and execute the program. The computer system mentioned here includes a CPU, various memories, an OS, and hardware such as peripheral devices.

The "computer-readable recording medium" refers to a storage device that has a temporary storing function. Examples of the recording medium include a magnetic disk, a magneto-optical disc, a CD-ROM, a DVD-ROM, a semiconductor disc (SSD), and a semiconductor memory, but the present invention is not limited thereto.

Further, the "recording medium" includes a volatile medium such as a DRAM or an SRAM, as in an internal volatile memory of a computer system serving as a server or a client, but the present invention is not limited thereto.

Furthermore, the "recording medium" includes a medium that retains a program for a short time, as in reception and transmission devices or a transmission device when a program is transmitted via a network such as the Internet or a communication line such as a telephone line, but the present invention is not limited thereto.

The computer program may be delivered to a computer through broadcast or a communication line and the computer receiving the computer program may execute the program. The program may be a program executing some of the foregoing processes or may be realized in combination with a program in which the above-described processes are already recorded in a computer system.

INDUSTRIAL APPLICABILITY

The present invention is applicable to a terminal cooperation system, a receiver, and a receiving method with which a broadcast program viewer can acquire information associated with a program more simply.

REFERENCE SYMBOLS

1: Broadcast provider device
11: Broadcast transmission device
111: Broadcast-associated data management unit
112: Signal setting unit
113: Broadcast transmission unit
12: Broadcast station server group
13: Contents management server
14: Program management server
15: Metadata management server
16: Contents delivery server
17: Broadcast station service server
18: Notification server
2: Service provider server group
21: Receiver app server
22: Service server
23: Contents delivery server
24: Notification server
3: Repository server
4: Receiver
401: Broadcast reception unit
402: Separating unit
403: Clock
404-1: First synchronization buffer
404-2: Second synchronization buffer
405-1: First decoder
405-2: Second decoder
406: Data broadcast execution unit
407: Video control unit
408: Video display unit
409: Audio control unit
410: Audio output unit
411: Communication input/output unit
412: Application execution control unit
413: Presentation control unit
414: Operation input unit
415: Dialing unit
416: Local information storage unit
417: External I/F unit
431: Application storage unit
432: Application authentication unit
433: Application management unit
434: Application control unit
435: Application execution unit
436: Receiver API unit
437: Terminal Cooperation API unit
438: Resource access control unit
439: Resource control unit
451: Policy data management unit
452: Policy data storage unit
453: Event interpretation unit
454: Policy level matching unit
455: Event control unit
456: Program policy storage unit
457: Policy adjustment unit
458: Policy level storage unit
471: Terminal device
472: External I/F unit
473: Control unit
474: Operation unit
475: Display unit
9: Communication network

The invention claimed is:

1. A terminal cooperation system comprising:
a receiver; and
a terminal device,
wherein the receiver comprises,
a first reception circuit configured to receive a broadcast signal which includes broadcast contents and metadata;

a first display circuit configured to display the broadcast contents included in the broadcast signal received by the first reception circuit;

a keyword acquisition circuit configured to acquire first search keywords, the acquisition of the first search keywords being performed based on metadata included in the broadcast signal received by the first reception circuit; and a first transmission circuit configured to transmit, to the terminal device, the first search keywords acquired by the keyword acquisition circuit, the transmission of the first search keywords being performed without transmitting, to the terminal device, the broadcast contents included in the broadcast signal received by the first reception circuit, wherein the terminal device comprises, a second reception circuit configured to receive the first search keywords transmitted by the first transmission circuit;

a second display circuit configured to display the first search keywords received by the second reception circuit;

an operation circuit configured to receive a first selection operation of selecting a first search keyword from the first search keywords displayed by the second display circuit; and a second transmission circuit configured to transmit, to a search engine, the selected first search keyword selected by the operation circuit, and wherein the keyword acquisition circuit is configured to acquire second search keywords which are not included in the broadcast signal, the acquisition of the second search keywords being performed based on a network address included in the broadcast signal received by the first reception circuit, the first transmission circuit is configured to transmit, to the terminal device, the second search keywords acquired by the keyword acquisition circuit, the second reception circuit is configured to receive the second search keywords transmitted by the first transmission circuit, the second display circuit is configured to display the second search keywords received by the second reception circuit, the operation circuit is configured to receive a second selection operation of selecting a second search keyword from the second search keywords displayed by the second display circuit, and the second transmission circuit is configured to transmit, to the search engine, the second search keyword selected by the operation circuit.

2. The terminal cooperation system according to claim 1, wherein the first transmission circuit is configured to transmit, to the terminal device, the first search keywords acquired by the keyword acquisition circuit and position information, the position information indicating position represented by the first search keywords, the second reception circuit is configured to receive the first search keywords and the position information transmitted by the first transmission circuit, and the second display circuit is configured to display the first search keywords and the position information received by the second reception circuit.

3. A receiver comprising:

a reception circuit configured to receive a broadcast signal which includes broadcast contents and metadata;

a display circuit configured to display the broadcast contents included in the broadcast signal received by the reception circuit;

a keyword acquisition circuit configured to acquire first search keywords, the acquisition of the first search keywords being performed based on the metadata included in the broadcast signal received by the reception circuit; and a transmission circuit configured to transmit, to the terminal device, the first search keyword acquired by the keyword acquisition circuit, the transmission of the first search keywords being performed without transmitting, to the terminal device, the broadcast contents included in the broadcast signal received by the reception circuit, wherein the keyword acquisition circuit is configured to acquire second search keywords which are not included in the broadcast signal, the acquisition of the second search keywords being performed based on a network address included in the broadcast signal received by the reception circuit, and the transmission circuit is configured to transmit, to the terminal device, the second search keywords acquired by the keyword acquisition circuit.

4. The receiver according to claim 3, wherein the keyword acquisition circuit is configured to acquire the first search keywords based on the metadata acquired from an event information table included in the broadcast signal.

5. The receiver according to claim 3, wherein the keyword acquisition circuit is configured to acquire the first search keywords based on the metadata acquired from BML contents included in the broadcast signal.

6. The receiver according to claim 3, wherein the keyword acquisition circuit is configured to acquire the first search keyword based on the metadata transmitted with a DSM-CC data carousel.

7. The receiver according to claim 3, wherein the transmission circuit is configured to transmit, to the terminal device, the first search keywords acquired by the keyword acquisition circuit and position information, the position information indicating a position represented by the first search keywords.

8. A receiving method comprising:

receiving a broadcast signal which includes broadcast contents and metadata;

displaying the broadcast contents included in the received broadcast signal;

acquiring first search keywords, the acquisition of the first search keywords being performed based on the metadata included in the received broadcast signal;

transmitting, to the terminal device, the acquired first search keyword, the transmission of the first search keywords being performed without transmitting, to the terminal device, the broadcast contents included in the received broadcast signal;

acquiring second search keywords which are not included in the broadcast signal, the acquisition of the second search keywords being performed based on a network address included in the received broadcast signal; and transmitting, to the terminal device, the acquired second search keywords.

9. The receiving method according to claim 8, further comprising:

transmitting, to the terminal device, the acquired first search keywords and position information, the position information indicating a position represented by the first search keywords.

* * * * *